United States Patent [19]
Montminy et al.

[11] Patent Number: 5,946,210
[45] Date of Patent: *Aug. 31, 1999

[54] CONFIGURING POWER CONVERTERS

[75] Inventors: Steven Norman Montminy, Groton; Brian James Shaffer, Reading; Patrizio Vinciarelli, Boston, all of Mass.

[73] Assignee: VLT Corporation, San Antonio, Tex.

[ * ] Notice: This patent issued on a continued prosecution application filed under 37 CFR 1.53(d), and is subject to the twenty year patent term provisions of 35 U.S.C. 154(a)(2).

[21] Appl. No.: 08/635,026

[22] Filed: Apr. 19, 1996

[51] Int. Cl.$^6$ .................................................. G06F 19/00

[52] U.S. Cl. ............... 364/468.03; 364/188; 364/468.09; 364/468.14; 364/152

[58] Field of Search ............................ 364/578, 488–489, 364/801–802, 490–491, 492, 480, 571.06, 571.07, 571.08, 571.02, 528.21, 468.03, 468.05, 468.09, 468.1, 468.14, 468.16, 188, 189, 184, 156, 149–154; 395/500, 919–921; 363/178; 705/8; 706/903, 904, 919–921; 345/964

[56] References Cited

U.S. PATENT DOCUMENTS

| | | | |
|---|---|---|---|
| 4,415,959 | 11/1983 | Vinciarelli | 363/21 |
| 4,441,146 | 4/1984 | Vinciarelli | 363/20 |
| 4,648,020 | 3/1987 | Vinciarelli | 363/71 |
| 4,675,797 | 6/1987 | Vinciarelli | 363/21 |
| 5,079,686 | 1/1992 | Vinciarelli | 363/15 |

(List continued on next page.)

FOREIGN PATENT DOCUMENTS 05041443  2/1993  Japan ............................. H01L 21/66

OTHER PUBLICATIONS

Karinthi R.R. et al., "An Algebraic Approach to Feature Interactions"; IEEE Transactions on Pattern Analysis and Machine Intelligence, vol. 14, No. 4, Apr. 1, 1992, pp. 469–484.

(List continued on next page.)

*Primary Examiner*—James P. Trammell
*Assistant Examiner*—Tuan Q. Dam
*Attorney, Agent, or Firm*—Fish & Richardson P.C.

[57] ABSTRACT

An automated system for designing power converters includes receiving power converter operating characteristic information, and, in a computer, determining alternative power converter configurations that are consistent with the operating characteristic information. One of the alternative power converter configurations that tends to have optimal efficiency is selected in the computer. Optimization criteria or selection criteria may be received, or a combined heat loss may be calculated for each configuration, and the selection may be of the configuration that is optimal with respect to the optimization criteria, or may be based upon the selection criteria, or may be of the configuration that minimizes the combined heat loss. The functional operating characteristic information and optimization criteria may be received by a first party from a second party. A power converter generator in a computer may determine power converter configurations that meet the functional operating characteristic information and determine and store information about each configuration with respect to the optimization criteria. One of the determined power converter configurations that tends to optimize the power converter configuration based on the optimization criteria is selected in the computer. Specifications for the selected power converter configuration are provided to the second party. Upon receipt by the first party of approval of the selected power converter configuration from the second party, fabrication information for the selected power converter configuration is delivered to a manufacturing facility.

66 Claims, 16 Drawing Sheets

Microfiche Appendix Included
(4 Microfiche, 216 Pages)

U.S. PATENT DOCUMENTS

| | | | |
|---|---|---|---|
| 5,084,824 | 1/1992 | Lam et al. | 364/490 |
| 5,111,413 | 5/1992 | Lazansky et al. | 364/578 |
| 5,164,911 | 11/1992 | Juran et al. | 364/578 |
| 5,220,512 | 6/1993 | Watkin et al. | 364/489 |
| 5,235,502 | 8/1993 | Vinciarelli | 363/20 |
| 5,245,543 | 9/1993 | Smayling et al. | 364/490 |
| 5,278,769 | 1/1994 | Bair et al. | 364/490 |
| 5,287,284 | 2/1994 | Sugino et al. | 364/468.03 |
| 5,365,403 | 11/1994 | Vinciarelli et al. | 361/707 |
| 5,402,358 | 3/1995 | Smith et al. | 364/490 |
| 5,443,534 | 8/1995 | Vinciarelli et al. | 29/593 |
| 5,459,673 | 10/1995 | Carmean et al. | 364/489 |
| 5,490,057 | 2/1996 | Vinciarelli et al. | 364/157 |
| 5,559,997 | 9/1996 | Tsuchida et al. | 395/500 |
| 5,560,537 | 10/1996 | Sadler et al. | 228/102 |
| 5,572,436 | 11/1996 | Dangelo et al. | 364/489 |
| 5,572,437 | 11/1996 | Rostoker et al. | 364/489 |
| 5,623,397 | 4/1997 | Vinciarelli | 363/20 |
| 5,777,877 | 7/1998 | Beppu et al. | 364/468.03 |
| 5,850,348 | 12/1998 | Berman | 364/488 |

OTHER PUBLICATIONS

Brauch I. et al., "Unterstuezung Des Liga–Herstellungsprozesses Mit Wissenbaiserten Methoden" ZWF Zeitschrift Fur Wirtschaftliche Fertigung Und Automisierung, vol. 88, No. 1, Jan. 1, 1993, pp. 38–40.

Sarma S.E. et al., "Rapid Product Realization from Detail Design", Computer Aided Design, vol. 28, No. 5, May 1, 1996, pp. 383–392.

General Electric Power Supply Pamphlet, SwitchMod Flexibility, GEA–10932, Sep. 1981.

Jin–Qin Lu et al., A Parameter Optimization Method for Electronic Circuit Design Using Stochastic Model Function, Scripta Techica, Inc., vol. 75, No. 4, Apr. 1992, pp. 13–25.

William Nye et al., "DELIGHT.SPICE: An Optimization–Based System for the Design of Integrated Circuits", IEEE, vol. 7, No. 4, Apr. 1988, pp. 501–519.

Linear Technology Corporation, SwitcherCAD User's Manual, 1992.

Application for United States Letters Patent, Circuit Encapsulation, Serial No. 08/340,162, filed Nov. 15, 1994.

Application for United States Letters Patent, Packaging Electrical Circuits, Serial No. 08/523,873, filed.

Application for United States Letters Patent, Plating Permeable Cores, Serial No. 08/563,230, filed Nov. 27, 1995.

DESIGN MATRIX for EFFICIENCY CALCULATIONS ~190

| DESIGN # | VIABLE DESIGN EXPANSION | | | | | | | SINGLE COMPONENT ADDED PER EQUATION SET | | | | | | | | SELECTION CRITERIA | | | |
|---|---|---|---|---|---|---|---|---|---|---|---|---|---|---|---|---|---|---|---|
| | Np | Ns | Lk_s | Cr | NVcc_p | NVcc_s | Dlw | Dlwd | Iout | Cout | Q1 | Qreset | Creset | EFFICIENCY | LEAD TIME | COST | MTBF |
| 37 | Np(2) | Ns(3) | Lk_s(7) | Cr(13) | NVcc_p(2) | NVcc_s(2) | Dlw(3) | Dlwd(3) | Iout(1) | Cout(1) | Q1(37) | Qreset(37) | Creset(37) | Eff(37) | LT(37) | Cost(37) | MTBF(37) |
| 38 | Np(2) | Ns(3) | Lk_s(7) | Cr(14) | NVcc_p(2) | NVcc_s(2) | Dlw(3) | Dlwd(3) | Iout(1) | Cout(1) | Q1(38) | Qreset(38) | Creset(38) | Eff(38) | LT(38) | Cost(38) | MTBF(38) |
| 39 | Np(2) | Ns(3) | Lk_s(7) | Cr(15) | NVcc_p(2) | NVcc_s(2) | Dlw(3) | Dlwd(3) | Iout(1) | Cout(1) | Q1(39) | Qreset(39) | Creset(39) | Eff(39) | LT(39) | Cost(39) | MTBF(39) |
| 40 | Np(2) | Ns(3) | Lk_s(7) | Cr(16) | NVcc_p(2) | NVcc_s(2) | Dlw(3) | Dlwd(3) | Iout(1) | Cout(1) | Q1(40) | Qreset(40) | Creset(40) | Eff(40) | LT(40) | Cost(40) | MTBF(40) |
| 41 | Np(2) | Ns(3) | Lk_s(7) | Cr(17) | NVcc_p(2) | NVcc_s(2) | Dlw(3) | Dlwd(3) | Iout(1) | Cout(1) | Q1(41) | Qreset(41) | Creset(41) | Eff(41) | LT(41) | Cost(41) | MTBF(41) |
| 42 | Np(2) | Ns(3) | Lk_s(7) | Cr(18) | NVcc_p(2) | NVcc_s(2) | Dlw(3) | Dlwd(3) | Iout(1) | Cout(1) | Q1(42) | Qreset(42) | Creset(42) | Eff(42) | LT(42) | Cost(42) | MTBF(42) |
| 43 | Np(2) | Ns(3) | Lk_s(8) | Cr(13) | NVcc_p(2) | NVcc_s(2) | Dlw(3) | Dlwd(3) | Iout(1) | Cout(1) | Q1(43) | Qreset(43) | Creset(43) | Eff(43) | LT(43) | Cost(43) | MTBF(43) |
| 44 | Np(2) | Ns(3) | Lk_s(8) | Cr(14) | NVcc_p(2) | NVcc_s(2) | Dlw(3) | Dlwd(3) | Iout(1) | Cout(1) | Q1(44) | Qreset(44) | Creset(44) | Eff(44) | LT(44) | Cost(44) | MTBF(44) |
| 45 | Np(2) | Ns(3) | Lk_s(8) | Cr(15) | NVcc_p(2) | NVcc_s(2) | Dlw(3) | Dlwd(3) | Iout(1) | Cout(1) | Q1(45) | Qreset(45) | Creset(45) | Eff(45) | LT(45) | Cost(45) | MTBF(45) |
| 46 | Np(2) | Ns(3) | Lk_s(8) | Cr(16) | NVcc_p(2) | NVcc_s(2) | Dlw(3) | Dlwd(3) | Iout(1) | Cout(1) | Q1(46) | Qreset(46) | Creset(46) | Eff(46) | LT(46) | Cost(46) | MTBF(46) |
| 47 | Np(2) | Ns(3) | Lk_s(8) | Cr(17) | NVcc_p(2) | NVcc_s(2) | Dlw(3) | Dlwd(3) | Iout(1) | Cout(1) | Q1(47) | Qreset(47) | Creset(47) | Eff(47) | LT(47) | Cost(47) | MTBF(47) |
| 48 | Np(2) | Ns(3) | Lk_s(8) | Cr(18) | NVcc_p(2) | NVcc_s(2) | Dlw(3) | Dlwd(3) | Iout(1) | Cout(1) | Q1(48) | Qreset(48) | Creset(48) | Eff(48) | LT(48) | Cost(48) | MTBF(48) |
| 49 | Np(2) | Ns(3) | Lk_s(9) | Cr(13) | NVcc_p(2) | NVcc_s(2) | Dlw(3) | Dlwd(3) | Iout(1) | Cout(1) | Q1(49) | Qreset(49) | Creset(49) | Eff(49) | LT(49) | Cost(49) | MTBF(49) |
| 50 | Np(2) | Ns(3) | Lk_s(9) | Cr(14) | NVcc_p(2) | NVcc_s(2) | Dlw(3) | Dlwd(3) | Iout(1) | Cout(1) | Q1(50) | Qreset(50) | Creset(50) | Eff(50) | LT(50) | Cost(50) | MTBF(50) |
| 51 | Np(2) | Ns(3) | Lk_s(9) | Cr(15) | NVcc_p(2) | NVcc_s(2) | Dlw(3) | Dlwd(3) | Iout(1) | Cout(1) | Q1(51) | Qreset(51) | Creset(51) | Eff(51) | LT(51) | Cost(51) | MTBF(51) |
| 52 | Np(2) | Ns(3) | Lk_s(9) | Cr(16) | NVcc_p(2) | NVcc_s(2) | Dlw(3) | Dlwd(3) | Iout(1) | Cout(1) | Q1(52) | Qreset(52) | Creset(52) | Eff(52) | LT(52) | Cost(52) | MTBF(52) |
| 53 | Np(2) | Ns(3) | Lk_s(9) | Cr(17) | NVcc_p(2) | NVcc_s(2) | Dlw(3) | Dlwd(3) | Iout(1) | Cout(1) | Q1(53) | Qreset(53) | Creset(53) | Eff(53) | LT(53) | Cost(53) | MTBF(53) |
| 54 | Np(2) | Ns(3) | Lk_s(9) | Cr(18) | NVcc_p(2) | NVcc_s(2) | Dlw(3) | Dlwd(3) | Iout(1) | Cout(1) | Q1(54) | Qreset(54) | Creset(54) | Eff(54) | LT(54) | Cost(54) | MTBF(54) |
| 55 | Np(2) | Ns(4) | Lk_s(10) | Cr(19) | NVcc_p(2) | NVcc_s(2) | Dlw(4) | Dlwd(4) | Iout(1) | Cout(1) | Q1(55) | Qreset(55) | Creset(55) | Eff(55) | LT(55) | Cost(55) | MTBF(55) |
| 56 | Np(2) | Ns(4) | Lk_s(10) | Cr(20) | NVcc_p(2) | NVcc_s(2) | Dlw(4) | Dlwd(4) | Iout(1) | Cout(1) | Q1(56) | Qreset(56) | Creset(56) | Eff(56) | LT(56) | Cost(56) | MTBF(56) |
| 57 | Np(2) | Ns(4) | Lk_s(10) | Cr(21) | NVcc_p(2) | NVcc_s(2) | Dlw(4) | Dlwd(4) | Iout(1) | Cout(1) | Q1(57) | Qreset(57) | Creset(57) | Eff(57) | LT(57) | Cost(57) | MTBF(57) |
| 58 | Np(2) | Ns(4) | Lk_s(10) | Cr(22) | NVcc_p(2) | NVcc_s(2) | Dlw(4) | Dlwd(4) | Iout(1) | Cout(1) | Q1(58) | Qreset(58) | Creset(58) | Eff(58) | LT(58) | Cost(58) | MTBF(58) |
| 59 | Np(2) | Ns(4) | Lk_s(10) | Cr(23) | NVcc_p(2) | NVcc_s(2) | Dlw(4) | Dlwd(4) | Iout(1) | Cout(1) | Q1(59) | Qreset(59) | Creset(59) | Eff(59) | LT(59) | Cost(59) | MTBF(59) |
| 60 | Np(2) | Ns(4) | Lk_s(10) | Cr(24) | NVcc_p(2) | NVcc_s(2) | Dlw(4) | Dlwd(4) | Iout(1) | Cout(1) | Q1(60) | Qreset(60) | Creset(60) | Eff(60) | LT(60) | Cost(60) | MTBF(60) |
| 61 | Np(2) | Ns(4) | Lk_s(11) | Cr(19) | NVcc_p(2) | NVcc_s(2) | Dlw(4) | Dlwd(4) | Iout(1) | Cout(1) | Q1(61) | Qreset(61) | Creset(61) | Eff(61) | LT(61) | Cost(61) | MTBF(61) |
| 62 | Np(2) | Ns(4) | Lk_s(11) | Cr(20) | NVcc_p(2) | NVcc_s(2) | Dlw(4) | Dlwd(4) | Iout(1) | Cout(1) | Q1(62) | Qreset(62) | Creset(62) | Eff(62) | LT(62) | Cost(62) | MTBF(62) |
| 63 | Np(2) | Ns(4) | Lk_s(11) | Cr(21) | NVcc_p(2) | NVcc_s(2) | Dlw(4) | Dlwd(4) | Iout(1) | Cout(1) | Q1(63) | Qreset(63) | Creset(63) | Eff(63) | LT(63) | Cost(63) | MTBF(63) |
| 64 | Np(2) | Ns(4) | Lk_s(11) | Cr(22) | NVcc_p(2) | NVcc_s(2) | Dlw(4) | Dlwd(4) | Iout(1) | Cout(1) | Q1(64) | Qreset(64) | Creset(64) | Eff(64) | LT(64) | Cost(64) | MTBF(64) |
| 65 | Np(2) | Ns(4) | Lk_s(11) | Cr(23) | NVcc_p(2) | NVcc_s(2) | Dlw(4) | Dlwd(4) | Iout(1) | Cout(1) | Q1(65) | Qreset(65) | Creset(65) | Eff(65) | LT(65) | Cost(65) | MTBF(65) |
| 66 | Np(2) | Ns(4) | Lk_s(11) | Cr(24) | NVcc_p(2) | NVcc_s(2) | Dlw(4) | Dlwd(4) | Iout(1) | Cout(1) | Q1(66) | Qreset(66) | Creset(66) | Eff(66) | LT(66) | Cost(66) | MTBF(66) |
| 67 | Np(2) | Ns(4) | Lk_s(12) | Cr(19) | NVcc_p(2) | NVcc_s(2) | Dlw(4) | Dlwd(4) | Iout(1) | Cout(1) | Q1(67) | Qreset(67) | Creset(67) | Eff(67) | LT(67) | Cost(67) | MTBF(67) |
| 68 | Np(2) | Ns(4) | Lk_s(12) | Cr(20) | NVcc_p(2) | NVcc_s(2) | Dlw(4) | Dlwd(4) | Iout(1) | Cout(1) | Q1(68) | Qreset(68) | Creset(68) | Eff(68) | LT(68) | Cost(68) | MTBF(68) |
| 69 | Np(2) | Ns(4) | Lk_s(12) | Cr(21) | NVcc_p(2) | NVcc_s(2) | Dlw(4) | Dlwd(4) | Iout(1) | Cout(1) | Q1(69) | Qreset(69) | Creset(69) | Eff(69) | LT(69) | Cost(69) | MTBF(69) |
| 70 | Np(2) | Ns(4) | Lk_s(12) | Cr(22) | NVcc_p(2) | NVcc_s(2) | Dlw(4) | Dlwd(4) | Iout(1) | Cout(1) | Q1(70) | Qreset(70) | Creset(70) | Eff(70) | LT(70) | Cost(70) | MTBF(70) |
| 71 | Np(2) | Ns(4) | Lk_s(12) | Cr(23) | NVcc_p(2) | NVcc_s(2) | Dlw(4) | Dlwd(4) | Iout(1) | Cout(1) | Q1(71) | Qreset(71) | Creset(71) | Eff(71) | LT(71) | Cost(71) | MTBF(71) |
| 72 | Np(2) | Ns(4) | Lk_s(12) | Cr(24) | NVcc_p(2) | NVcc_s(2) | Dlw(4) | Dlwd(4) | Iout(1) | Cout(1) | Q1(72) | Qreset(72) | Creset(72) | Eff(72) | LT(72) | Cost(72) | MTBF(72) |
| ... N | | | | | | | | | | | | | | | | | |

CONFIGURING POWER CONVERTERS

REFERENCE TO MICROFICHE APPENDIX II

A microfiche appendix containing rules, equations, and tables used by the converter generator consisting of 216 microfiche images on 4 microfiche cards is filed herewith.

A portion of the disclosure of the patent document contains material which is subject to copyright protection. The copyright owners have no objection to the facsimile reproduction by anyone of the patent document or the patent disclosure, as it appears in the Patent and Trademark Office patent file or records, but otherwise reserves all copyright rights whatsoever.

BACKGROUND

This invention relates to configuring power converters.

Typically, a series of predetermined power converter configurations are supplied by power converter manufacturers. Several manufacturers, for example, Vicor Corporation™, provide an automatic selection system which compares user specified power converter functional requirements (e.g., input and output voltage and output power) and physical requirements (e.g., number of pins and package size) to the functionality offered by a variety of preconfigured models (e.g., a power converter 'configuration' is a predefined combination of component parts which results in a converter which meets a predefined set of functional and physical requirements) of converters and selects a preconfigured model, or combination of preconfigured models, that meet the user's needs. If the user's needs cannot be met, the user is informed and requested to change his requirements.

If a customer needs a power converter with particular requirements that cannot be met by a preconfigured model within the manufacturer's product line, then a power converter designer, using basic equations and experience, may be asked to design a power converter configuration that meets the customer's needs. In general, a particular set of functional and physical requirements may be met with many different power converter configurations. As a result, two designers with the same customer information may come up with different power converter configurations. Designers generally use rules of thumb and experience to try to achieve good overall performance (e.g., high conversion efficiency). However, due to time and resource constraints, a designer can only try a limited number of different configurations.

General Electric Corporation™ has offered prepackaged modular building blocks for configuring switching power supplies. Each building block (e.g., rectifier block, switch block, output filter block) forms a portion of a switching power supply and each is available in various voltage and current ratings to allow configuring supplies of varying input voltage, output voltage, and power ratings. A microcomputer-based software package aids the user in selecting those building blocks which, when connected together, will result in a power supply which meets the user's functional requirements. The software selects those pre-defined blocks which will result in a certain combination of input voltage, output voltage, and power level.

There is a large body of literature regarding mathematical methods for optimizing active or passive circuit performance. In general, these methods rely on having objective sets of functions which describe the circuit, or suitably accurate models, and then using mathematical minimization and maximization methods (e.g., least-squares, gradient-projection, steepest descent) to find a single, theoretically optimal, solution which achieves some circuit performance objective, or objectives, subject to constraints. In some cases, the optimization method is linked with a circuit simulator, such as SPICE. See, for example, Lu and Adachi, "A Parameter Optimization Method for Electronic Circuit Design Using Stochastic Model Function," Electronics and Communications in Japan, Part 3, Vol. 75, No. 4, 1992, pp. 13–25; Nye, et al, "DELIGHT.SPICE: An Optimization-Based System for the Design of Integrated Circuits," IEEE Transactions on Computer-Aided Design, Vol. 7, No. Apr. 4, 1988, pp. 501–519; Ivanov, et al, "Computer-Aided Optimization of the Parameters of Electronic Circuits," Telecommunications and Radio Engineering, Part 2 (Radio Engineering), Vol. 26, No. 11, November 1971, pp. 124–128.

Linear Technology Corporation, Milpitas, Calif., USA, offers a software based power supply design program called SwitcherCAD; National Semiconductor Corporation, Santa Clara, Calif., USA, offers a software based power supply design program called Simple Switcher. Both programs accept a set of predefined functional specifications and generate parts lists and schematics for a power supply which meets the specifications. Both can produce designs for different topologies (e.g., isolated flyback, non-isolated PWM buck). The user of the programs can modify component values and other design parameters and observe the effects on performance, e.g., conversion efficiency. Both programs use pre-defined equations for generating a solution.

SUMMARY

In general, in one aspect, the invention features a method for use in determining a power converter configuration including receiving power converter operating characteristic information, and, in a computer, determining alternative power converter configurations that are consistent with the operating characteristic information. The method also includes, in the computer, selecting one of the alternative power converter configurations that tends to have optimal efficiency.

Implementations of the invention may include one or more of the following features. Efficiency may be measured as power converter heat loss.

In general, in another aspect, the invention features a method for use in determining a power converter configuration including receiving power converter operating characteristic information, receiving optimization criteria, and, in a computer, determining alternative power converter configurations that are consistent with the operating characteristic information and selecting one of the alternative power converter configurations that tends to be optimal with respect to the optimization criteria.

Implementations of the invention may include one or more of the following features. Determining alternative power converter configurations may include calculating a combined heat loss for each alternative power converter configuration, and wherein selecting one of the power converter configurations may include selecting a configuration having the least combined heat loss. Determining alternative power converter configurations may further include evaluating the component interrelations for each alternative power converter configuration and/or determining performance metrics for each alternative power converter configuration based on a predetermined set of performance criteria. The performance criteria and the optimization criteria may be the same.

The method may further include storing the determined performance metrics, and/or accessing the stored determined performance metrics. Determining alternative power converter configurations may also include eliminating power converter configurations that are inconsistent with a predetermined design constraint, and the predetermined design constraint may be a power dissipation threshold. Determining alternative power converter configurations may include eliminating power converter configurations that are inconsistent with the received power converter operating characteristic information.

The optimization criteria may include efficiency, reliability, lead time, conducted noise, or cost, and the optimization criteria may include at least two criteria.

In general, in another aspect, the invention features a method for use in determining a power converter configuration including determining alternative power converter configurations that are consistent with operating characteristic information, calculating a combined heat loss for each of the alternative power converter configurations, and selecting one of the alternative power converter configurations that tends to minimize the combined heat loss.

Implementations of the invention may include one or more of the following features. The method may further include receiving the operating characteristic information from a user.

In general, in another aspect, the invention features a method for use in determining a power converter configuration including receiving power converter operating characteristic information, receiving selection criteria, and, in a computer, determining alternative power converter configurations that are consistent with the operating characteristic information and selecting one of the alternative power converter configurations in response to the selection criteria.

Implementations of the invention may include one or more of the following features. Determining alternative power converter configurations may include selecting power converter components from an inventory of available components having a range of parameter values, and the range may comprise two parameter values. The power converter components may include a number of primary turns on a transformer and/or a number of secondary turns on a transformer. The power converter components may include a resonant capacitor, a transformer having a core shield pattern, output rectifiers, output filter components, input filter components, main switches, drive transformers, and/or reset circuit components. The selection criteria may include efficiency, reliability, lead time, conducted noise, or cost, and the method may further include receiving another selection criteria, wherein the power converter configuration is selected in accordance with both selection criteria.

Determining alternative power converter configurations may include determining performance metrics for each alternative power converter configuration based on a predetermined set of performance criteria, and the performance criteria and the selection criteria may be the same. The method may further include storing the determined performance metrics and accessing the stored determined performance metrics. The method may also include generating a bill of materials for the selected one of the alternative power converter configurations, determining power converter configurations that are consistent with previously received operating characteristic information and are functionally fully backwards compatible with power converters delivered earlier in time, and/or providing a user interface to the computer, wherein the operating characteristic information is received through the user interface. The user may be a customer or a power converter designer.

In general, in another aspect, the invention features a method of supplying a power converter including receiving, at a first party, operating characteristic information about a power converter from a second party, and, in a computer, determining a power converter configuration that is consistent with the operating characteristic information and tends to optimize the power converter based on optimization criteria and providing specifications for the determined power converter configuration.

Implementations of the invention may include one or more of the following features. The method may further include receiving, at the first party, the optimization criteria from the second party or generating a bill of materials for the determined power converter configuration. The method may also include sending electronically the bill of materials to a computer integrated manufacturing line and building the determined power converter configuration at a computer integrated manufacturing facility. The method may include providing the specifications for the determined power converter configuration to the second party, and the specifications may include availability information and/or cost for the determined power converter configuration.

The computer may be at a site local to the first party and wherein receiving, at the first party, operating characteristic information about a power converter from the second party may include accessing a user interface of the computer from a site at the second party that is remote to the site local to the first party.

In general, in another aspect, the invention features a system for use in determining a power converter configuration including a program for determining a power converter configuration that is consistent with operating characteristics and tends to optimize the power converter configuration based on optimization criteria, and a user interface, coupled to the program, that receives the power converter operating characteristics.

Implementations of the invention may include one or more of the following features. The user interface may also receive the optimization criteria. The system may also include a computer for executing the program.

In general, in another aspect, the invention features a method for use in determining a power converter configuration including receiving, at a first party, functional operating characteristic information about a power converter and optimization criteria from a second party, and, in a computer, accessing a power converter generator that determines power converter configurations that meet the functional operating characteristic information and which determines and stores information about each configuration with respect to the optimization criteria. The method also includes in the computer selecting one of the determined power converter configurations that tends to optimize the power converter configuration based on the optimization criteria, providing specifications for the selected power converter configuration to the second party, receiving, at the first party, approval of the selected power converter configuration from the second party, and delivering fabrication information for the selected power converter configuration to a manufacturing facility.

Implementations of the invention may include one or more of the following features. The method may also include initiating an electrical connection between the first party and the second party, and sending the operating characteristic information and the optimization criteria from the second party to the first party via the electrical connection. The method may include building a power converter from the fabrication information, and shipping the power converter to the second party. Before receiving approval, the method may further include receiving, at the first party, different operating characteristic information from the second party, and, in the computer, determining another power converter configuration that is consistent with the different operating characteristic information and tends to optimize the another power converter configuration's based on the optimization criteria and providing the specifications for the determined another power converter configuration to the second party. Before receiving approval, the method may also include receiving, at the first party, different optimization criteria from the second party, and, in the computer, determining another power converter configuration that is consistent with the operating characteristic information and tends to optimize the another power converter configuration based on the different optimization criteria, and providing the specifications for the determined another power converter configuration to the second party.

Advantages of the invention may include one or more of the following. After a user specifies functional and physical requirements (e.g., input and output voltage ratings; power level) and selection criteria (e.g., efficiency, reliability, and cost), a power converter design and bill of materials (BOM) generator ("converter generator") provides the user with a power converter configuration that meets the user's needs and is optimized with respect to the specified selection criteria. The converter generator consistently provides the user with an optimal power converter configuration by generating power converter configurations that meet particular design constraints and component availability limits and by selecting the configuration that is optimal with respect to the user specified selection criteria. The user may interactively receive configuration feedback information by specifying new selection criteria and/or functional and physical requirements and analyzing the new optimal configuration provided by the converter generator. The performance metrics calculated for each configuration generated by the converter generator, with respect to several different design criteria, such as efficiency or conducted noise levels, can be made available for use in other applications. The converter generator provides the user with power converter configurations in "real-time", and through access to component availability and manufacturing scheduling data, the converter generator provides the user with accurate configuration availability dates (i.e., time to ship).

An existing customer may place several orders for a given power converter part number over a period of time. During this time period the converter generator may change, either to provide improved performance or due to modifications in the complement of parts from which converters may be configured. By storing appropriate information about the operating characteristics of the converter first configured for the customer, the converter generator is able to consistently deliver units which are backward compatible with units delivered earlier in time.

After receiving a user's approval of a particular optimized power converter configuration, a bill of materials (BOM) is automatically generated. The BOM is then electronically sent to a computer integrated manufacturing (CIM) site where it is used to select a manufacturing line and control the building of the approved power converter configuration.

Other advantages and features will become apparent from the following description, and from the claims.

DESCRIPTION

FIGS. 5 and 6 are computer screen displays.

FIGS. 10a–10b are portions of a matrix of possible power converter configurations.

POWER CONVERTER DESIGN

Figure 1:
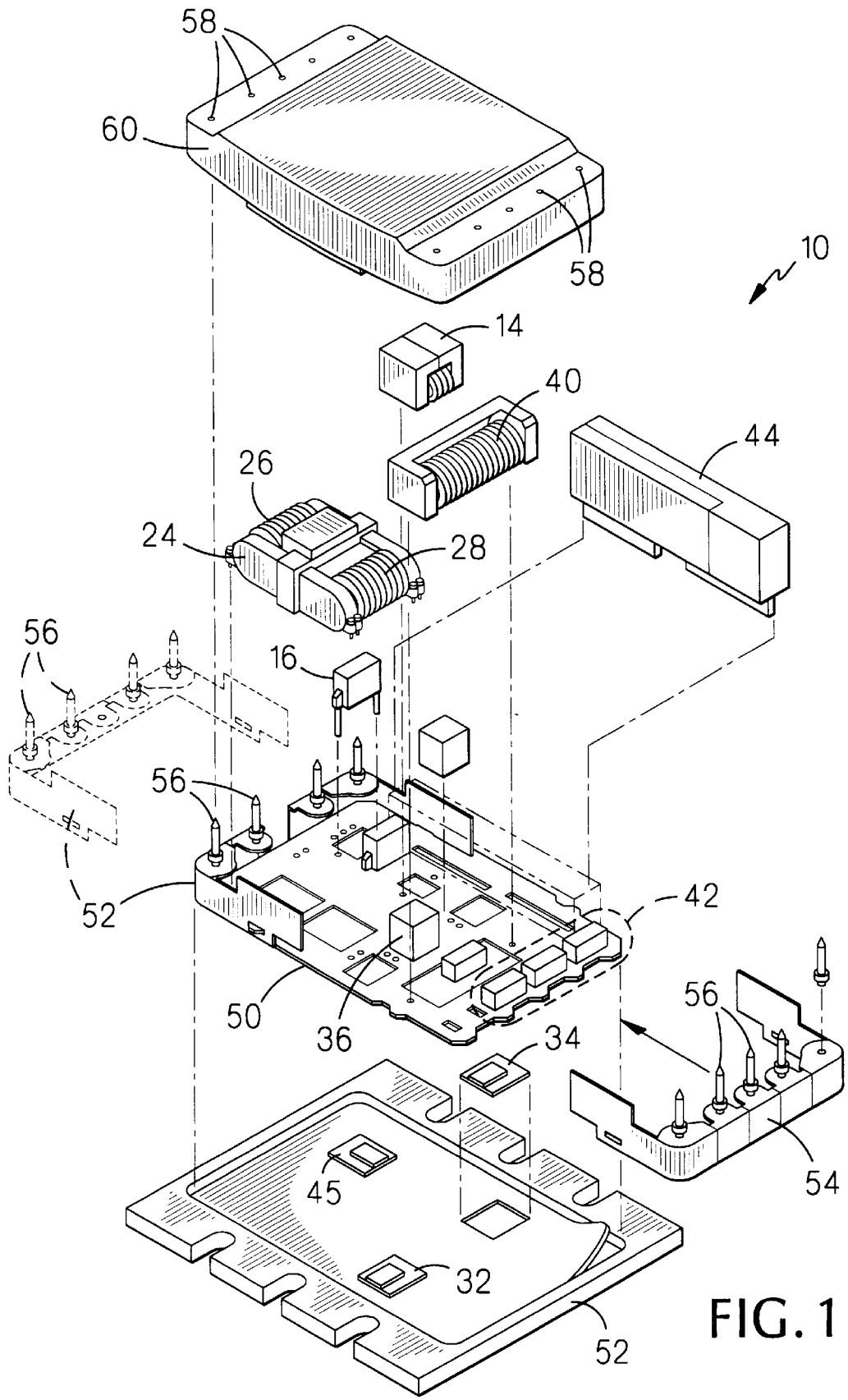
FIGS. 1 and 2 are a perspective exploded view and a block diagram, respectively, of a power converter.

An exploded view of a modular DC-DC power converter is shown in FIG. 1. Converters of this type, which typically provide a single output voltage in a relatively small, high density package, are frequently applied in both 'distributed power' applications and, in combination with other converters of similar construction and other accessory products and components, to create application-specific customized centralized power systems. This 'power component' approach to power system design offers great flexibility, fast time-to-market and economy.

In general, there are many DC-DC converter circuit configurations (e.g., combinations of component parts) which will meet some predefined set of functional specifications (e.g., deliver a predefined amount of output power (e.g., 300 Watts) at a predefined output voltage (e.g., 5 Volts) while operating over a predefined range of input voltage (e.g., from 180 VDC to 400 VDC)). Each different configuration, however, will differ with respect to certain performance metrics, such as conversion efficiency, cost and reliability. An engineer engaged in designing a converter will typically use some combination of knowledge, experience and analysis to try to find an initial solution which meets the predefined set of functional requirements. On the basis of tests or simulations the initial design might be iterated a few times until it is deemed to be 'good enough.' This generally means that, in addition to meeting the predefined functional requirements, some set of performance metrics, such as a minimum value of conversion efficiency or a maximum cost, have also been achieved. Given time and resource constraints and the complexities of circuit interactions, it is normally not feasible for engineers to seek 'optimal' solutions or to even be able to gauge how closely their solutions come to being optimal with respect to one or more metrics, such as efficiency or cost.

Contemporary manufacturing methods, equipment and systems enable power converters to be manufactured in high volume on flexible, highly automated, manufacturing lines. Through use of a common set of manufacturing equipment and processes a virtually unlimited number of power converter configurations may be manufactured, each configuration sharing a common construction and packaging scheme but differing from other configurations in terms of its functional specifications (e.g., range of input operating voltage, output voltage, output power).

Thus, while contemporary manufacturing techniques offer the capability of producing a large variety of power converter configurations essentially in real-time, methods for rapidly generating converter configurations which meet discretional, and somewhat arbitrary, user-defined functional specifications, and which are also optimized with respect to one or more user-specified performance metrics, have not been available. Thus, users have generally had to choose between accepting a 'pre-configured' converter model which most closely meets their needs or accepting the longer lead-times, non-recurring costs and uncertainties associated with having a manufacturer go through the process of 'customizing' a converter configuration to meet their unique functional specifications. In either case, there has been no means for ensuring that a configuration is optimized relative to specific performance metrics of importance to the user. It is therefore one object of the invention to provide means for rapidly generating power converter configurations which meet a specific set of user-defined functional specifications (as opposed to requiring that the user accept the closest pre-configured model) and which is also optimized with respect to other performance metrics, such as efficiency, cost, and/or reliability.

Refer to Appendix I, below, for a description of the operation and construction of one kind of modular power converter and a description of the manufacturing processes and equipment used for its manufacture.

To satisfy a particular set of functional requirements, for example, output voltage, input voltage, operating range, output power, and maximum baseplate operating temperature (e.g., the temperature at which thermal shutdown is controlled to occur), components are selected from an available range of values to create a converter configuration.

Complex component interrelations influence configuration-specific design metrics such as efficiency, cost, lead time, and reliability. One configuration may be the most efficient, while another is the most reliable.

As an example of component interrelations, for a zero-current switching forward converter, a small ON time for the main switch may lead to high peak resonant current and harmonic losses, for example, transformer core losses, winding losses, and resonant capacitor losses. To reduce core losses (i.e., to increase efficiency), the ON time of the main switch may be lengthened, and the peak resonant current reduced, by increasing the transformer's leakage inductance. This can be accomplished by increasing the number of primary and secondary turns while maintaining the original turns ratio constant. Although the winding losses may increase due to the increased numbers of turns, the net effect may be a reduction in losses (i.e., an increase in efficiency) if the winding losses increase by less than the amount by which the other harmonic losses are decreased.

Figure 4:
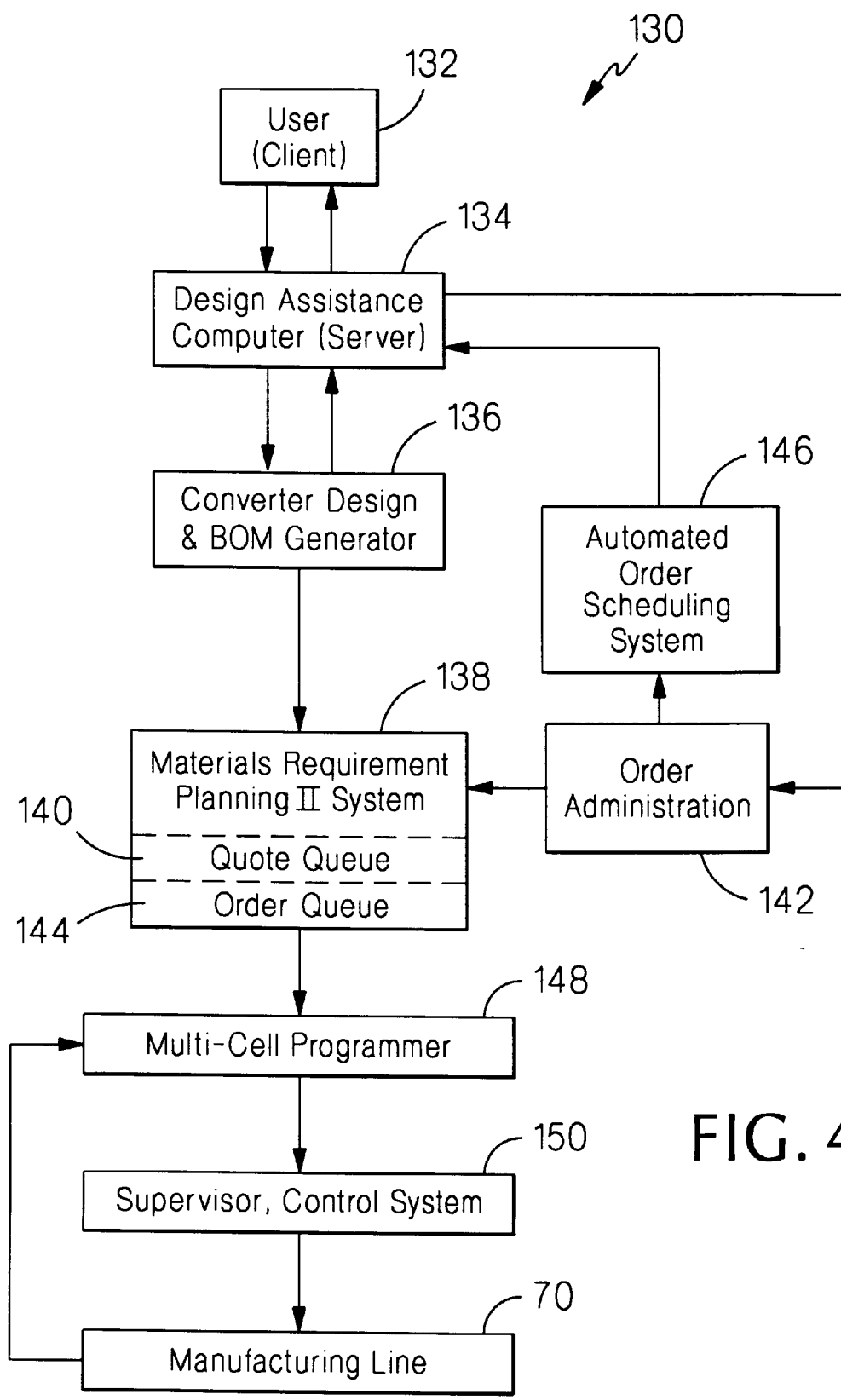
FIG. 4 is a block diagram of a computer integrated manufacturing system.

Referring to FIG. 4, a computer integrated manufacturing (CIM) system 130 generates power converter configurations which meet user specified functional requirements and which are optimized with respect to user specified design metrics. By optimization we do not mean a mathematically or theoretically ideal circuit solution. Rather, we mean including the best available solution subject to certain limiting constraints. In generating converter configurations, for example, the limiting constraints include the set of production processes available for fabricating the converters and the range of parts and part values which can be selected, or created during manufacture, for use in the converters. Thus, when we say "optimization" we include a method by which we first generate a set of configurations, subject to the limiting constraints, which meet a predefined set of functional characteristics. We then shift through the generated set configurations to select the configuration, or configurations, which provide the best possible performance with respect to defined optimization criterion or criteria. The system generates its output in real time (e.g, the results are available in minutes or hours, as opposed to days or weeks), thereby eliminating the lead times associated with conventional engineering design processes.

Figure 5:
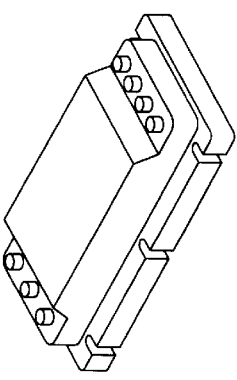

Software running on a user's (client) computer 132 interfaces with software running on a design assistance computer (DAC, server) 134 and through an input screen 135 (FIG. 5) allows the user to input power converter functional requirements and criteria with respect to selected design metrics. The user's inputs are passed to a converter design and bill of materials (BOM) generator program 136 (converter generator). Users may include customers, the converter manufacturer's sales representatives; marketing, applications, engineering, and manufacturing personnel; and converter design engineers.

The converter generator 136 is a rules and equation based system. Using a database of all available power converter components (e.g., all of the components which are available to, or which may be created by, the manufacturing process), the converter generator generates power converter configurations that meet the user's functional requirements. In doing so, the generator discards configurations that cannot meet the functional requirements or which do not meet predetermined design constraints. For example, the converter generator discards configurations that exceed a predefined maximum power dissipation threshold for each component. The converter generator also calculates each configuration's design metrics, including efficiency, reliability, cost, and lead time, and selects the optimal configuration by comparing the metrics of each configuration to a set of weighted criteria defined by the user. For example, if a user specifies that conversion efficiency is the sole design metric to be optimized, the converter generator selects the most efficient configuration.

The user may input new functional requirements and/or select different design metrics or a combination of design metrics. For each input change, the converter generator generates all possible configurations, discards those that do not meet predetermined design constraints, and provides the user with a part number and a cost and delivery date corresponding to a configuration that is most nearly optimal with respect to the user's selected design metrics. Changing the functional requirements and/or selected design metrics provides the user with interactive feedback on each converter design decision.

For instance, the user may input particular functional requirements and select efficiency as the design metric for optimization, then change the selected design metric to reliability, and compare the cost and delivery dates corresponding to the two resulting configurations. Alternatively, the user might wish to compare configurations which are optimized for conversion efficiency (e.g., the percentage of the power withdrawn from the input source and delivered to the load) and for power density (e.g., the maximum power rating of the converter divided by the volume occupied by the converter) since these two metrics usually exhibit an inverse relationship (in part because higher density parts (e.g., smaller windings; smaller semiconductor die area or fewer die) exhibit relatively higher ohmic resistances which, in turn, dissipate more power as heat under a given set of operating conditions).

Assume, for example, that a manufacturer offers three converter product families, each differing from the other in terms of package size and the maximum amount of power which can be delivered (e.g., at a power density of 80 Watts per cubic inch, a 'micro' package might deliver up to 100 Watts; a 'mini' package might deliver up to 200 Watts; a 'maxi' package might deliver up to 400 Watts). If the customer were seeking a solution which delivers 200 Watts of power, the most efficient configuration generated by the converter generator might involve two 'micro' products, each delivering 100 Watts in a synchronized, power sharing, array (see, for example, U.S. Pat. Nos. 4,648,020 and 5,079,686, incorporated by reference).

On the other hand, the highest power density configuration might be a single 'mini' product delivering the full 200 Watts. The 'maxi' solution would exhibit one-fourth of the power density of the 'mini' solution and cost more, but it would offer better conversion efficiency. If the user also decided to investigate fault-tolerant solutions (e.g., an 'N+1' fault tolerant solution would be one in which a single point of failure—for example a single converter failure—would not interrupt operation of the power system at full rated power) then the converter generator might present three different solutions depending on whether the user's main criteria involved efficiency, power density or cost. For example, the highest efficiency solution might involve three 'micro' converters, each rated to deliver 100 Watts in a fault-tolerant, synchronized, power sharing, array (see, e.g., U.S. Pat. No. 5,079,686). The lowest cost solution might involve two 'mini' converters, each rated to deliver 200 Watts in a fault-tolerant, power-sharing, array. The highest power density solution might involve three 'micro' converters, each rated to deliver 100 Watts in fault-tolerant, power-sharing, array. There are, of course, virtually an unlimited number of ways by which a user can investigate the interactive effects of selecting different design metrics, e.g., efficiency, power density, cost, conducted noise, fault tolerance, or combinations of metrics, as criteria for optimization.

Since the converter generator produces a number of configurations which meet the user's functional requirements and calculates the performance of each configuration against several different design metrics, a variety of useful information can be made available from the converter generator for use in other applications. For example, converters of the kind shown in FIG. 1 are almost always used in applications in which the amount of conducted noise generated by the converter is of importance. This is because most power systems must meet regulatory standards which set limits on conducted emissions (e.g., the amount of normal-mode and/or common-mode power, voltage or current reflected back onto the converter's input or output connections as a function of frequency). Since the internal physical arrangement of the converter is well-defined, the amount of normal-mode and common-mode interference present at both the input and output connections of the converter may be closely estimated (e.g., based upon the specific combination of components used; the operating frequency and frequency range; the ON and OFF times and parasitic impedances of the switching elements and rectifiers; the parasitic capacitances between components and parasitic inductances in major signal paths within the converter). Once calculated, this information can be used in a variety of ways.

Assume, for example, that a user has selected a configuration based upon optimal efficiency or power density. The information regarding the conducted noise performance of the converter can then be used, either by the user or by another automated design system, to design or select an input source filter which will allow meeting some predefined set of conducted interference requirements.

Alternatively, the user may wish to examine tradeoffs with respect to overall system size and efficiency (i.e., where the system consists of the combination of the converter, or converters, and external conducted interference filters and related utility source interface circuitry). For example, the most efficient converter might incorporate relatively small internal input filter elements to minimize losses within those elements. This, however, might tend to increase both the physical size of, and power loss within, external noise filtering elements. By trying various different converter configurations the user (or a collateral software system which designs or selects filters and related circuit elements based upon the generated noise and the desired system noise performance) could optimize overall system size, power density or efficiency. In general, information regarding how different configurations perform with respect to various design metrics may be used by users, or by computer-based automated systems, in performing related system design or optimization tasks.

Once a configuration is selected, the converter generator generates a bill of material (BOM), assigns it a part number, and determines a cost and a delivery date. The part number, cost and delivery date are sent to the user via the DAC interface and are also stored along with the user's functional requirements. To place an order within some predefined period of time (e.g., 60 days), the user inputs the part number and the quantity of converters to be delivered; the stored information is retrieved and a BOM is re-generated and sent to a materials requirement planning (MRP) system 138. The MRP system generates a quote corresponding to the part number and logs the quote in a quote queue 140. This information is passed to the order administrator 142. The order administrator generates an order from the corresponding quote in the quote queue, deletes the quote, logs the order in an order log 144, and notifies an automatic sales order scheduling system 146 (AOSS). The AOSS has access to manufacturing line schedules and capacity, component availability (in stock and on order), the order queue, and the BOM associated with the current order. The AOSS generates a final delivery date, enters the order in the manufacturing line schedule, and sends the delivery date to the user through the DAC interface. The order administrator may mark an order as a priority order to cause the AOSS to schedule the order to be built during the current day.

A software system called a multi-cell programmer 148 (MCP) is notified of orders scheduled to be built during each day. The MCP verifies the completeness and consistency of all engineering and manufacturing data required to build each order. As an example of engineering data, placement coordinates for all surface mount components must be defined in the engineering database for the PCB upon which the component will be placed. As an example of manufacturing data, the MCP verifies that all surface mount components placed at a specific pick and place location are loaded in the component magazines of the equipment which will do the placement. If any exception conditions exist that prevent the order from being built, such as missing data or incorrect line set up, then the MCP indicates that the order cannot be built and places the order on hold until the exception condition is corrected.

Figure 6:
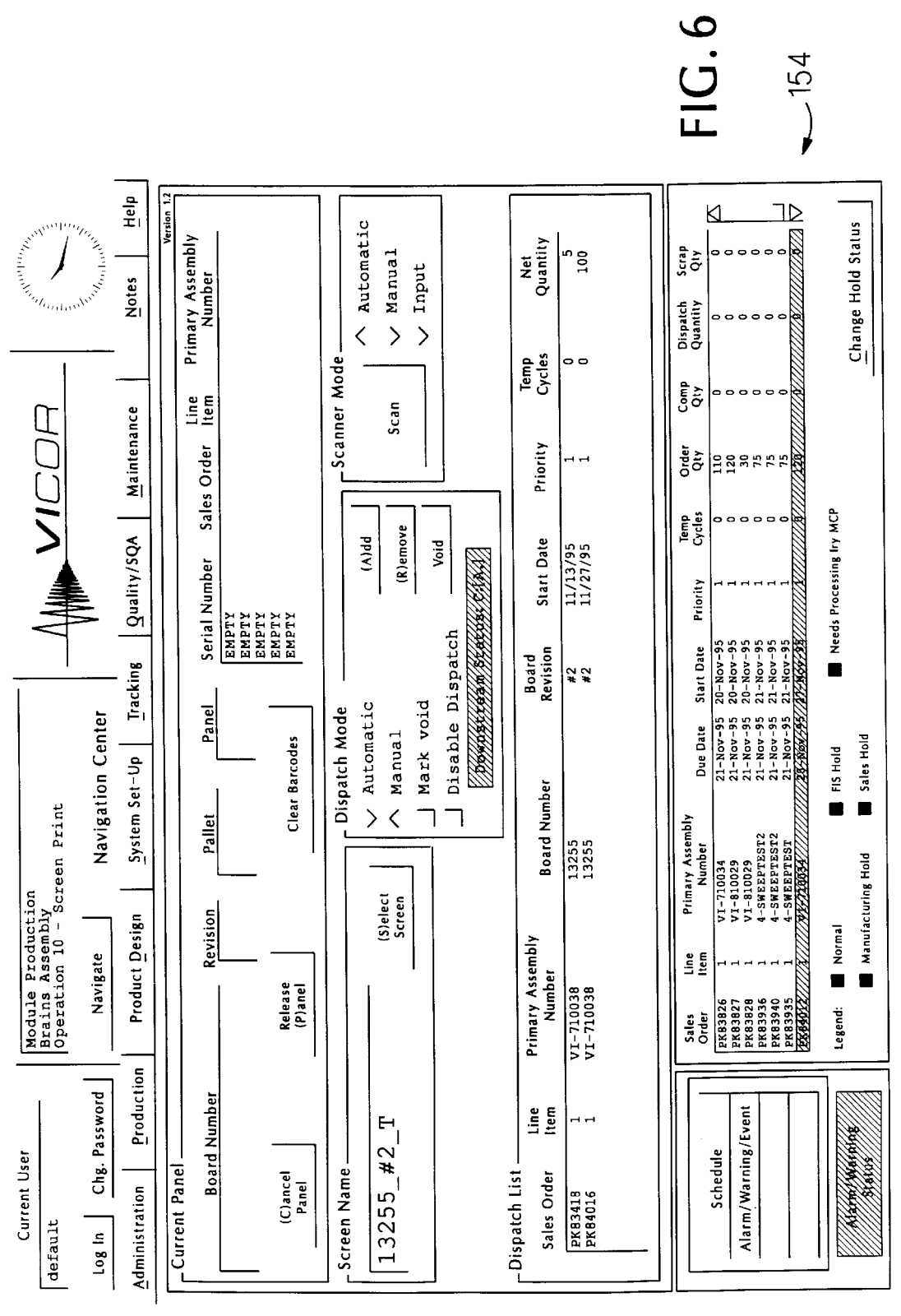

The MCP sends the order status to a supervisory control system (SCS) 150. The SCS may include a video display screen on which the list of orders 154 (FIG. 6), and the status of the orders, is displayed for an operator. If missing components, or non-availability of certain workcells, prevent certain orders from being built, their status will be designated as non-buildable by the SCS. When necessary components or workcells are subsequently made available, the MCP will change the order's status from non-buildable to buildable.

When the MCP verifies that an order is buildable, it generates an assembly instruction file for the order, which is then considered an eligible candidate for initiating the manufacture of the product on the line (dispatching). The assembly instruction file includes the BOM, module specifications, printed circuit board component placement coordinates, component test specifications, and subassembly graphics. Manufacturing line 70 then uses the assembly instruction file to build the corresponding order.

Once a customer's first order for a particular part number is manufactured, certain key functional parameters associated with the configuration are associated with the converter part number and stored for later use. This is done because a particular customer may place several orders for a given power converter model (e.g., part number) over a long period of time. During this time period the converter generator may change, either to provide improved performance or due to modifications in the complement of parts from which converters may be configured (e.g., certain parts may be replaced by others due, for example, to parts improvements or obsolescence). By storing appropriate information about the operating characteristics of the converter first configured for the customer (e.g., for a zero-current switching converter, the transformer turns ratio, the value of the secondary-reflected leakage inductance and the value of the resonant capacitance), the converter generator is able to consistently deliver units which are functionally fully backwards compatible with units delivered earlier in time.

Converter Design and BOM Generator

Figure 7:
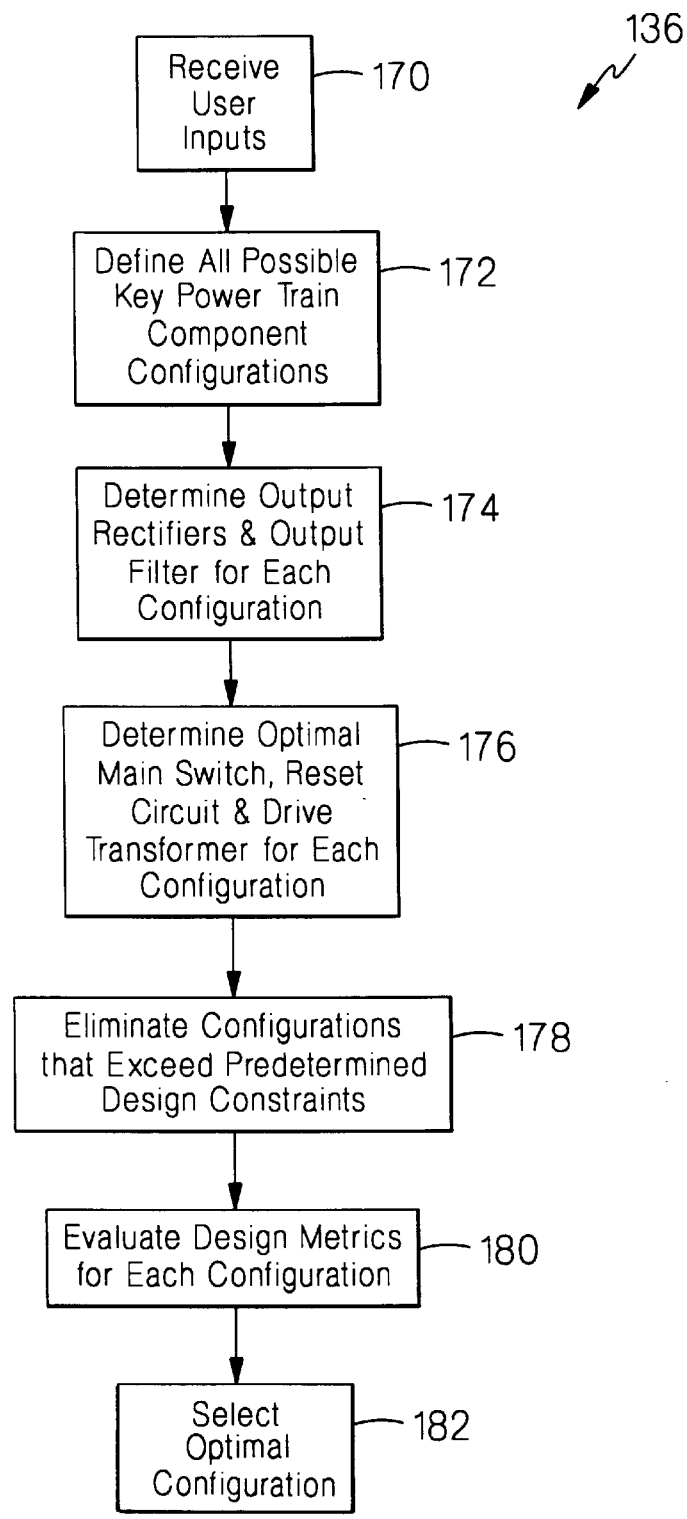
FIG. 7 is a flow chart showing the operation of the converter design and BOM generator of FIG. 4.

Referring to FIG. 7, the converter design and BOM generator (converter generator) 136 (FIG. 4) receives (step 170) a user's inputs, including functional requirements and selected design metrics, from the DAC interface. The functional requirements include input voltage range, output voltage, output power, and maximum baseplate operating temperature, while the selectable design metrics include efficiency, cost, lead time, and reliability. Using the functional requirements, the converter generator generates (step 172) all possible key power train component configurations. The key power train components include the number of primary ($N_p$) and secondary ($N_s$) turns of a transformer T1 24 (FIG. 8), the secondary-reflected leakage inductance ($L_{lk\_s}$)(referred to as the 'leakage inductance'), and resonant capacitance ($C_r$). Inductor 162 ($L_{LK\_S}$) represents the leakage inductance of T1. The turns ratio ($N_p 26/N_s 28$) is a function of the input and output voltages; the leakage inductance is a function of the number of secondary turns; and the resonant capacitance is a function of the turns ratio, output power, and leakage inductance.

The converter generator then determines (step 174) the output rectifiers ($D_{FWD}$ 32 and $D_{FW}$ 34) and output filter ($L_{out}$ 40 and $C_{out}$ 42) required for each configuration of key power train components. Selection of the components in a reset circuit 22; a drive transformer $T_D$ 20; and a main switch Q1 18; and the allowable value of the magnetizing inductance of transformer, T1are strongly interdependent. As a result, for each configuration, the converter generator generates (step 176) and evaluates all possible (and operative) combinations of the above components, determines which combination dissipates the least amount of power (i.e., optimal efficiency), and adds that combination to the configuration.

The converter generator discards (step 178) power converter configurations that exceed predetermined design constraints. For example, configurations in which any component dissipates power in excess of a predetermined power dissipation threshold are discarded. The maximum power dissipation threshold for each component is a function of the component ratings, the component and system thermal impedances and the maximum baseplate temperature rating for the converter. The converter generator then evaluates (step 180) the design metrics for each configuration, and selects the most nearly optimal configuration by comparing the metrics for each configuration to a set of weighted criteria defined by the user.

Figure 10A:
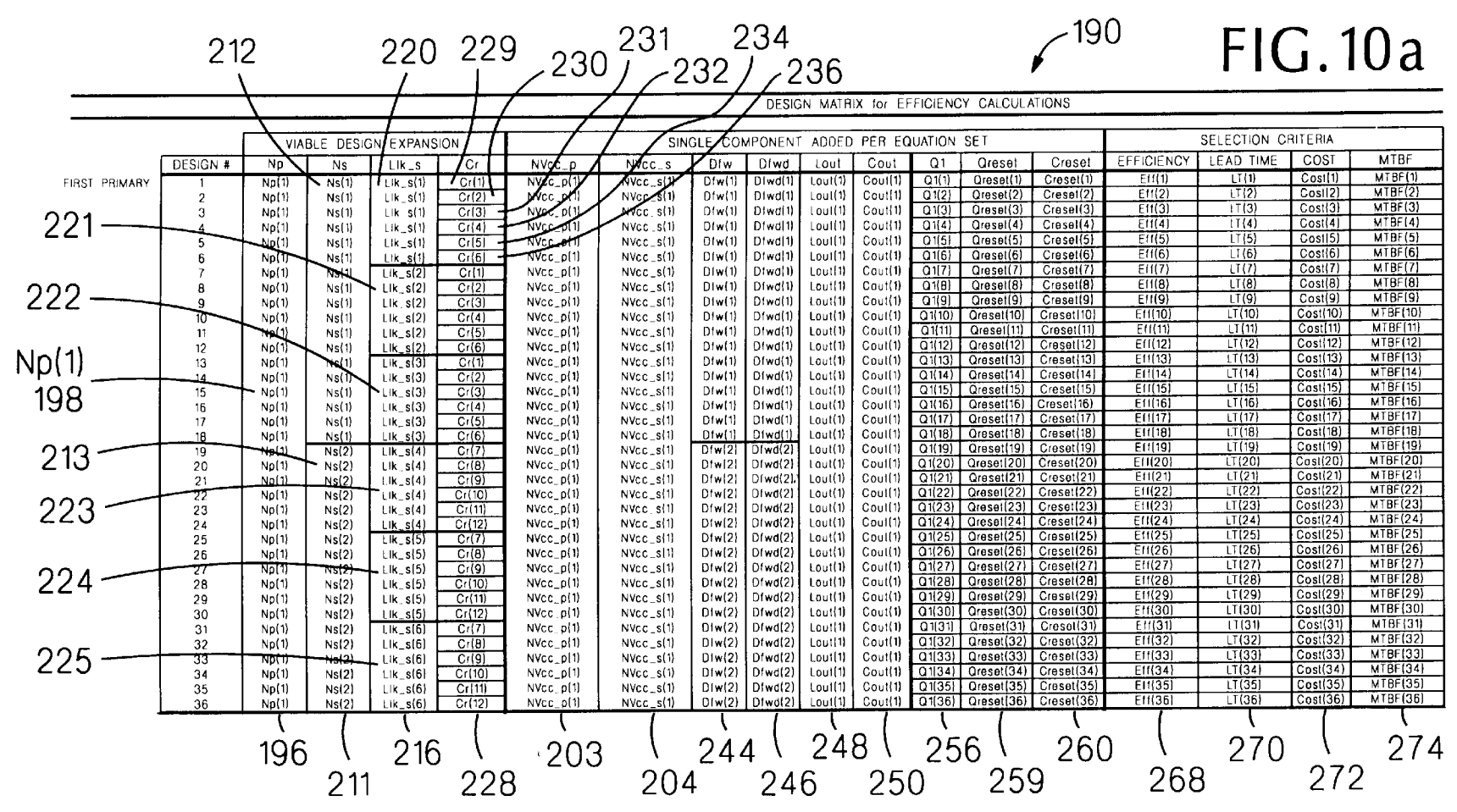

Referring to FIGS. 9a–9d, after receiving (step 170) a user's inputs, the converter generator defines (step 172) all possible key power train component configurations 190 (a portion of which are shown in FIGS. 10a–10b) by first determining (step 192) all possible combinations of primary and secondary windings on transformer T1. The converter generator begins by determining (step 194) the number of primary turns ($N_p$, column 196) with respect to the input voltage range. Predetermined maximum and minimum volt per turn values, $V_{in}/N_p$, stored in design constraint table 197, are used to select the range of primary turns for the transformer T1. The maximum volt per turn primary yields the highest core loss and lowest winding loss. The minimum volt per turn primary yields the lowest core loss and highest winding loss.

For each different number of primary turns, the converter generator then calculates (step 202) the number of turns of primary ($N_{Vcc\_p}$, column 203) and secondary ($N_{Vcc\_s}$, column 204) auxiliary windings 205, 206 (FIG. 8), respectively. The auxiliary windings are used to power the primary and secondary control circuitry 208, 209. The auxiliary windings are calculated with respect to the number of transformer T1 primary turns $N_p$ and the required control circuitry voltage.

For each different number of primary turns, the converter generator also calculates (step 210) the number of secondary turns (column 211) as a function of the number of primary turns and the user specified output voltage. The converter generator also selects the next highest number of secondary turns. For example, if the number of secondary turns is calculated at 1.5 turns, bobbins carrying 2 and 3 turns are selected from table 199. As a result, for each different number of primary turns, two secondary turns are chosen ($N_{s(1)}$ 212 and $N_{s(2)}$ 213 corresponding to $N_{p(1)}$; $N_{s(3)}$ 214 and $N_{s(4)}$ 215 corresponding to $N_{p(2)}$).

For each secondary winding, the design generator calculates three different secondary leakage inductance values 218, each value corresponding to a different copper shield pattern on the cores used in transformer T1. Each shield pattern has an associated leakage inductance factor $A_{LK}$ (nanohenries/turns$^2$) which is related to the amount of core surface area covered by the shield. The leakage inductance is also related to the number of secondary turns. For a more detailed discussion of controlling leakage inductance with core shield patterns, see U.S. patent application Ser. No. 07/759,511 (now abandoned), entitled "Transformer With Controlled Interwinding Coupling and Controlled Leakage Inductances and Circuit Using Such Transformer", and U.S. patent application Ser. No. 08/563,230 (now abandoned), entitled "Plating Permeable Cores", incorporated by reference. To provide flexibility, three shield patterns are made available and three corresponding values of leakage inductance are calculated for each selected combination of primary and secondary turns.

The converter generator now calculates the voltages imposed on the resonant capacitors, $C_r$ (36, FIG. 8), as a function of the transformer turns ratio ($N_p/N_s$) and the primary to secondary damping coefficient. The damping coefficient is a function of the resistive components in series with the $L_{lk\_s}$-$C_r$ circuit. For example, the resistive components include printed circuit board trace resistance, transformer resistance, and the equivalent series resistance (ESR) of the resonant capacitors.

At this point the converter generator could calculate values of resonant capacitors for each value of leakage inductance associated with each combination of primary and secondary windings (based upon the predefined value of converter output power and predefined high and low limits on maximum converter operating frequency 227). However, as a practical matter, most of the values calculated in that way would ultimately result in unworkable configurations (e.g., they would not provide for zero-crossing of resonant current at maximum input voltage and load power), so, as a means of limiting computing time and minimizing generation of extraneous configurations, a different approach is taken. For each turns ratio, the converter generator determines (step 226) the approximate values of resonant capacitance $C_r$ (column 228) that may be needed solely on the basis of maximum converter output power and the desired lower and upper limits on maximum converter operating frequency (e.g., 600 KHz and 1.2 MHz). The maximum converter output power and the lower limit on maximum converter operating frequency are used to define an upper limit on energy-per-operating cycle and this, in turn, is used to calculate an upper limit for the value of capacitance (e.g., using the approximation that the energy-per-operating cycle is $[\frac{1}{2}][C^*V_p^2]$, where $V_p$ is the peak voltage across the capacitor during the operating cycle); likewise the upper limit on maximum converter operating frequency is used to define a lower limit on energy-per-operating cycle and this, in turn, is used to calculate a lower limit for the value of capacitance. By this means a minimum and maximum value of resonant capacitance may be calculated for each turns ratio. In addition, several more (e.g., four) resonant capacitor values, having incremental values between the minimum and maximum values, are also chosen (a 20% increment in the value of $C_r$ provides a 10% change in the resonant frequency of the $L_{LK\_S}$-$C_r$ circuit). Thus, for each turns ratio a total of six values of resonant capacitance are chosen (e.g., $C_{r(1)}$-$C_{r(6)}$, 229–234).

The converter generator checks (step 242) each power train configuration for zero crossing criteria by calculating the peak current through the resonant capacitor (i.e., for each value of leakage inductance) and comparing that value to a predetermined maximum DC output current (e.g., the converter maximum output power rating, Pout, divided by converter output voltage, $V_{out}$). If the peak value of resonant current is consistent with achieving zero crossing, the converter generator retains the configuration.

The maximum number of possible power train configurations results when no configurations are eliminated. In the above example, for each number of primary turns a maximum of thirty-six configurations are generated. Each value of primary turns will have two secondary turns, three leakage inductance values (for each secondary), and six values for resonant capacitors. Thus, if eight different primary turn bobbins were selected, a maximum of 288 configurations (36 times 8) of key power train components could be generated After defining all viable key power train components (step 172, FIG. 7), the converter generator determines (step 174) the output rectifiers ($D_{FW}$ and $D_{FWD}$, columns 244, 246) and output filter components ($L_{out}$ and $C_{out}$, columns 248, 250) required by each configuration. The lowest voltage rating output rectifiers are selected (step 252) with respect to the turns ratio and output power. The output filter components (Lout and Cout) are selected (step 254) such that: (1) the maximum amount of output capacitance is used (based upon the total number of capacitors which can be placed within a product and the maximum values of capacitance available for the defined value of output voltage) as a means of minimizing converter output ripple and (2) $L_{out}$, in combination with $C_{out}$, results in an output filter breakpoint frequency which is consistent with some desired, predefined, value of control loop bandwidth.

Given the power train components, the conversion frequency at various operating conditions can be calculated and stored for future use in power dissipation calculations. The operating frequency is the rate at which energy is transferred from the primary to the secondary of transformer T1 The operating frequency will be evaluated at three different operating conditions 1) LLFL: low-line, full load (minimum input voltage, maximum output power), 2) HLFL: high-line, full load (maximum input voltage, maximum output power) and 3) NLNL: nominal-line, nominal load (50% of input voltage range, 75% of maximum output power).

For each power train configuration (including key power train components, output rectifiers, and output filter components), the converter generator then determines (step 176) which combination of main switch (Q1 column 256, FIGS. 10a–10b), reset circuit (including $Q_{reset}$ 257, $C_{reset}$ 258, columns 259, 260), drive transformer $T_D$ 20, and magnetizing inductance ($L_{mag}$) 266 dissipates the least amount of power (i.e., is optimal with respect to efficiency). In calculating power dissipation, both conductive and switching losses are considered. The power loss due to switching Q1 ($P_{SW}$) is equal to one half of the output capacitance ($C_{oss}$ 268, FIG. 8) of Q1 times the square of drain-to-source voltage ($V_{c\_oss}$) times the operating frequency ($f_c$)

$$P_{SW}=\tfrac{1}{2}C_{oss}V_{c\_oss}^2 f_c.$$

At ideal zero-voltage switching, Q1 is switched when $V_{c\_oss}$ is zero resulting in zero switching losses ($P_{SW}$).

To accurately determine the non-ideal switching losses for each main switch, reset circuit, and drive transformer combination, $V_{c\_oss}$ and $C_{oss}$ (which is a function of $V_{c\_oss}$) need to be accurately calculated at the time Q1 is turned on. The time between $Q_{reset}$ being turned off and Q1 being turned on ($\tau_{zvs}$) is the amount of time allowed for the magnetizing current in T1 to non-dissipatively discharge the $C_{oss}$ of MOSFET switch Q1 to zero volts. If $V_{c\_oss}$ is zero at the time Q1 turns on, the circuit is said to perform 'zero-voltage switching.'

$\tau_{zvs}$ includes two time intervals $t_1$ and $t_2$ corresponding to two different circuit states having two different $C_{oss}$ discharge rates. Time interval $t_1$ corresponds to the period during which both the magnetizing inductance ($L_{mag}$ 266) and the primary-reflected leakage inductance contribute to the discharge rate of $C_{oss}$, whereas time interval $t_2$ corresponds to the period during which only the primary leakage inductance contributes to the discharge, leading to a slower $C_{oss}$ discharge rate. The cross-over between $t_1$ and $t_2$ corresponds to the time at which the voltage across the primary winding $N_p$ of T1 drops to zero and $D_{FWD}$ becomes forward biased, thereby shorting out Lmag.

After determining (step 176) the Q1, reset circuit, and drive transformer combination that dissipates the least amount of power for each converter configuration and adding that combination to the converter configuration matrix, the converter generator eliminates (step 178, FIG. 7) configurations that exceed predetermined design constraints. In one example, the converter generator calculates (step 178', FIG. 9c) each configuration's worst case power dissipation and compares that value to a power dissipation threshold associated with the user-specified value of maximum baseplate operating temperature. Lower baseplate operating temperatures correspond to higher power dissipation thresholds. The converter generator discards any configurations having a worst case power dissipation that exceeds a maximum power dissipation threshold. If the converter generator determines that no configuration satisfies all predetermined design constraints (such as power dissipation), then the converter generator will use a successive approximation scheme to determine the closest limits to the original specifications that have a solution.

If more than one configuration passes the previous step, the converter generator will then evaluate (step 180) each configuration's design metrics, including efficiency (Eff, column 268), lead time (LT, column 270), cost (column 272), and reliability (mean time between failure, MTBF, column 274), and select (step 182) the configuration that is optimal with respect to the user selected design metrics. In one example, a user specifies the efficiency design metric, and the converter generator calculates (step 276) the efficiency of each configuration by calculating the power dissipation of each component in the configuration at NLNL and then summing these values. The converter generator then selects the most efficient configuration. Instead of selecting one design metric, the user may choose a weighted combination of two or more design metrics. For example, a user may specify that efficiency have an 80% weighting and cost a 20% weighting to cause the converter generator to select a configuration that meets the user's functional requirements and is among the top 20% of configurations in terms of efficiency and among the top 80% in terms of cost effectiveness.

The converter generator then calculates and selects (step 278) input filter components from a table 280 of available input inductors and input capacitors and adds these components to the selected configuration. The input filter components might, for example, be selected to provide a fixed breakpoint frequency of, for example, 20 KHz. Or they may be selected to provide a fixed amount of attenuation, for example, 40 dB at 1 Mhz, or to provide a fixed percentage of input-reflected ripple current (e.g., the peak-to-peak current variation at the input of the converter expressed as a percentage of the DC input current drawn by the converter). The user may be given the ability to request a different attenuation, for example, 60 dB, or to select different input filter components as a means of altering the cost and/or input-reflected ripple current characteristics of the converter.

The converter generator then selects (step 282) control circuitry 44 (FIGS. 1 and 7) components from a table 283 of control circuitry components, adds them to the selected configuration, and generates (step 284) a bill of material (BOM). The converter generator also assigns the configuration a part number, calculates a configuration cost, and estimates a delivery date based upon the quantity of converters specified by the user. The converter generator sends (step 286) this information to the user via the DAC 134 (FIG. 4) and the MRP system 138.

Other Embodiments

Other embodiments are within the scope of the following claims.

For example, additional functional requirements that may be input by the user include input ripple/noise level, output ripple/noise level, operating frequency range, and transient responses; other optimization criteria may also be used, such as power density.

As another example, instead of one mother board 50 (FIG. 1), multiple mother boards may be available and correspond to power converters of different physical sizes. The user may specify that the converter generator try to fit a particular configuration into a module package of a particular size or request that the converter be packaged in the smallest package in which it will fit.

Figure 11:
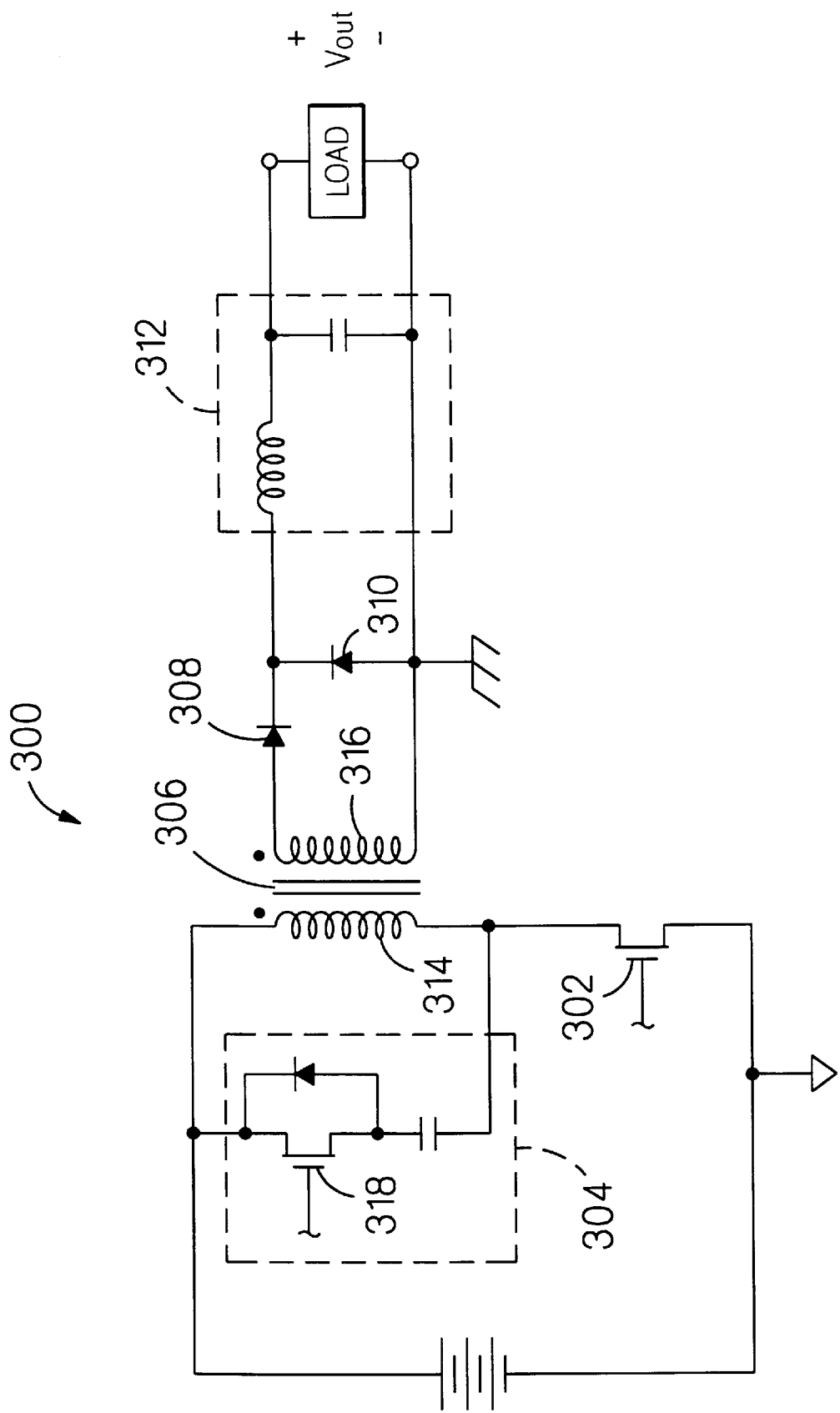
FIG. 11 is a schematic diagram of a pulse-width-modulated forward converter.

Application of the invention is not limited to forward converters switching at zero-current, but may be applied to any kind of power converter. For example, if, as shown in FIG. 11, the converter were a pulse-width-modulated forward converter 300 operating at a fixed frequency and comprising a main switch 302, an active reset circuit 304 of the kind described in U.S. Pat. No. 4,441,146, a transformer 306, a rectifier diode 308, a freewheeling diode 310 and an output filter 312, then the converter generator might generate configurations on the basis of: usable transformer primary 316 and secondary 318 turns and turns ratio; the impact of magnetizing current on efficiency accruing from zero-voltage switching behavior of the main switch 302 (i.e., due to a small delay introduced between the turn-on time of the main switch and the turn-off time of the reset switch 318, as taught in U.S. Pat. No. 4,441,146); effects of the fixed operating frequency on harmonic losses, including switching losses in the main switch. In general, all of the factors cited are interactive to one degree or another and all would effect various converter performance metrics, including power density, conversion efficiency, cost, reliability and package density.

Appendix I

Figure 2:
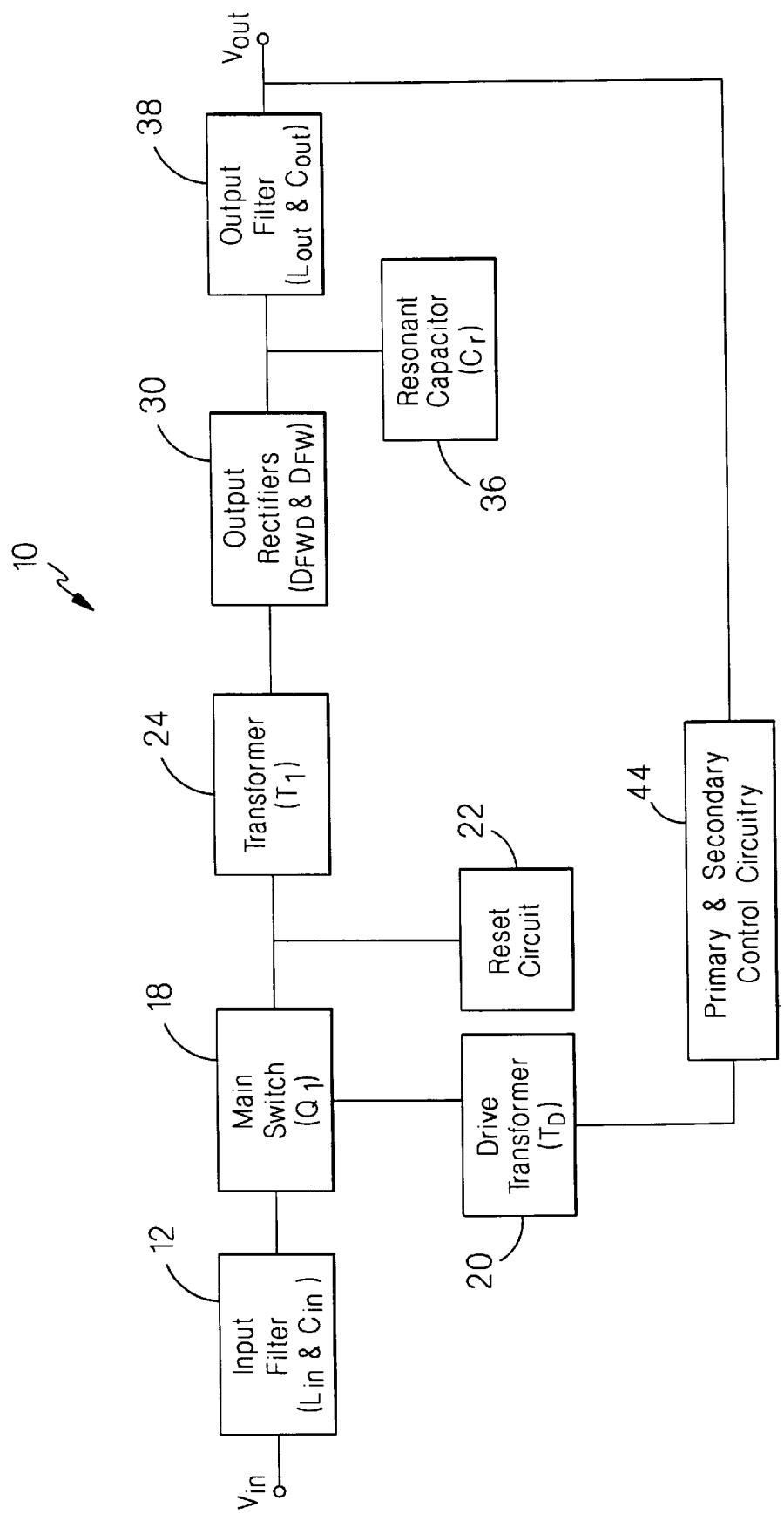
Figure 8:
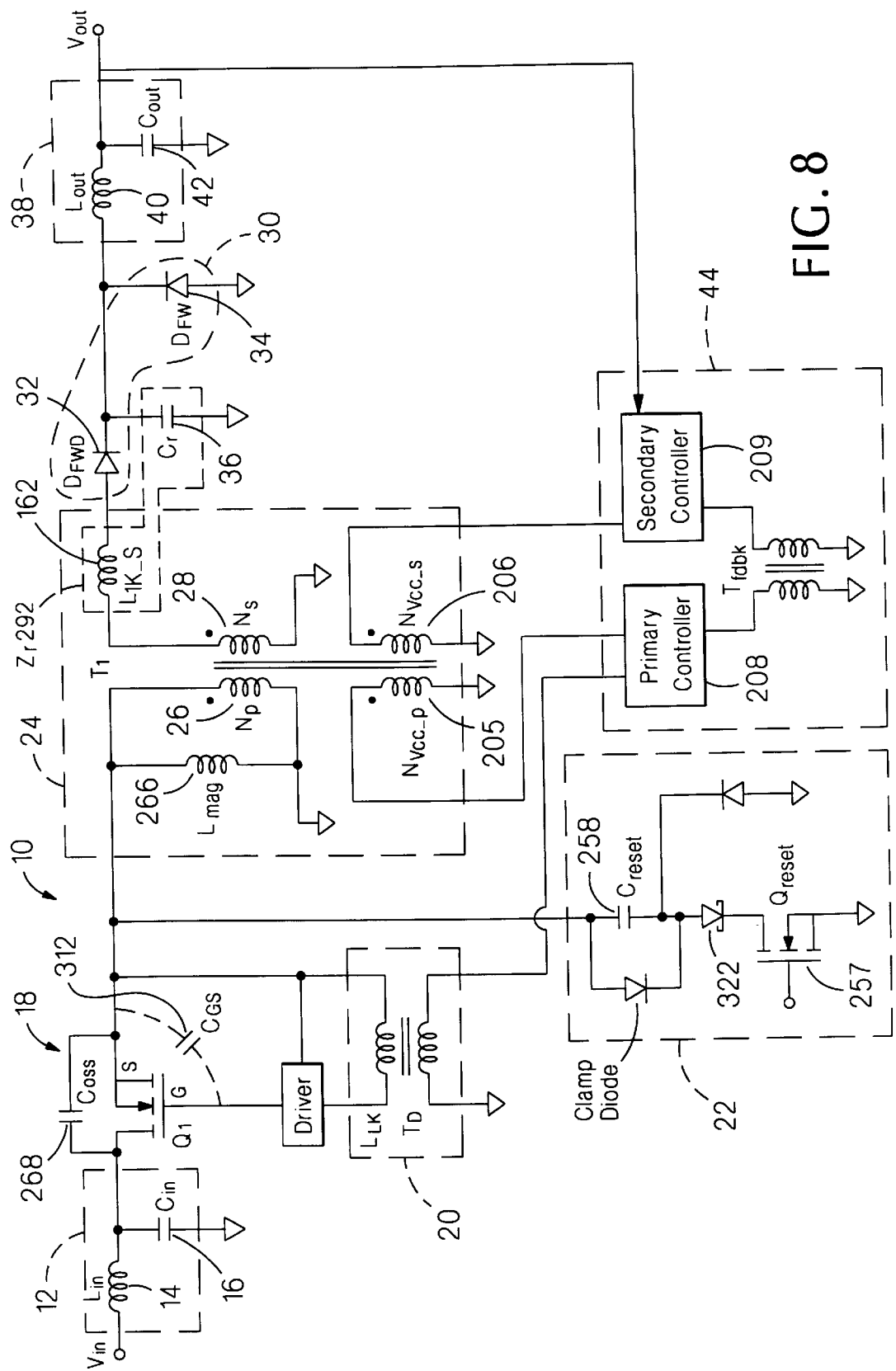
FIG. 8 is a circuit diagram of the power converter of FIGS. 1 and 2.
Figure 9A:
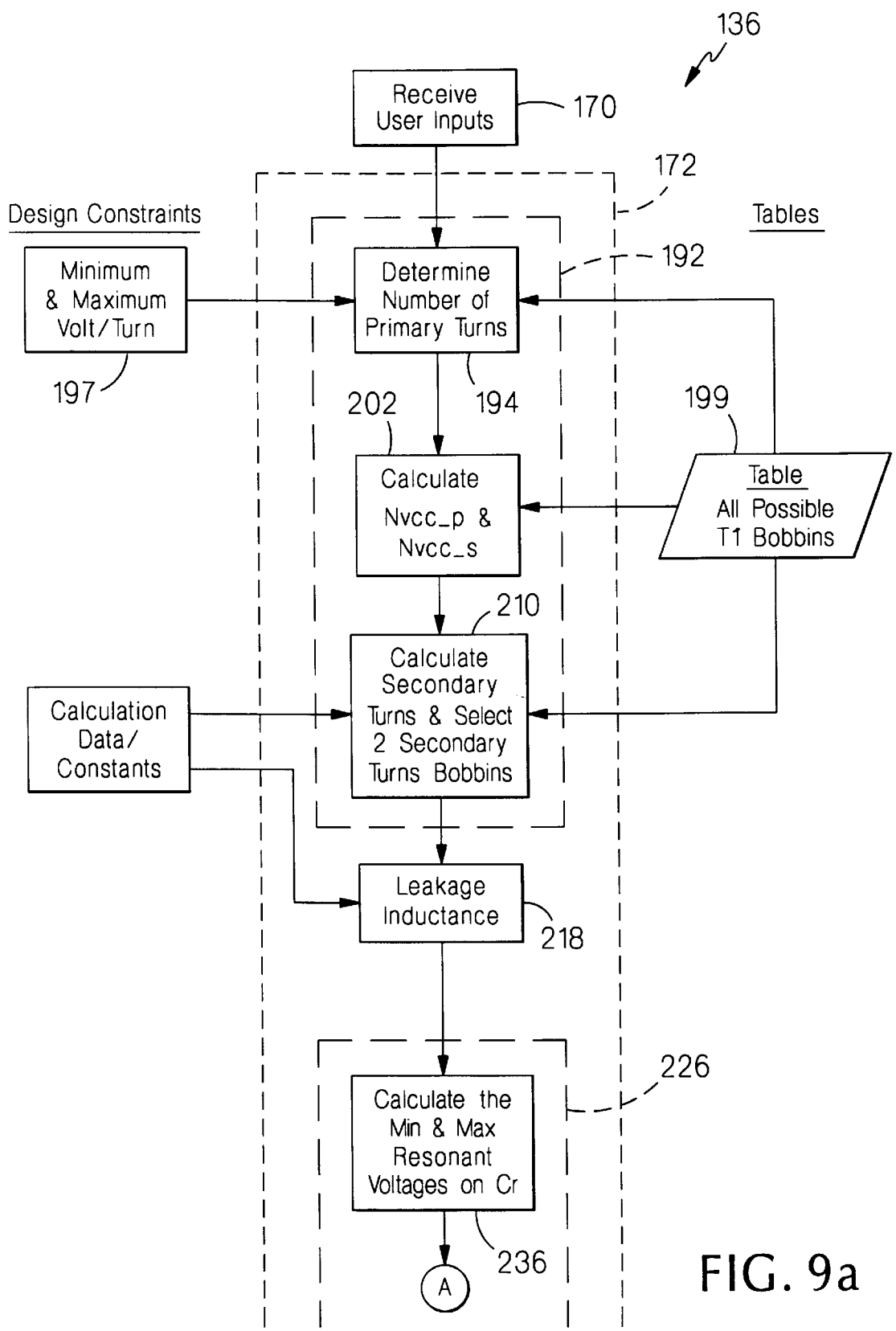
FIGS. 9a–9d are a flow chart of the operation of the converter design and BOM generator of FIG. 4.
Figure 9B:
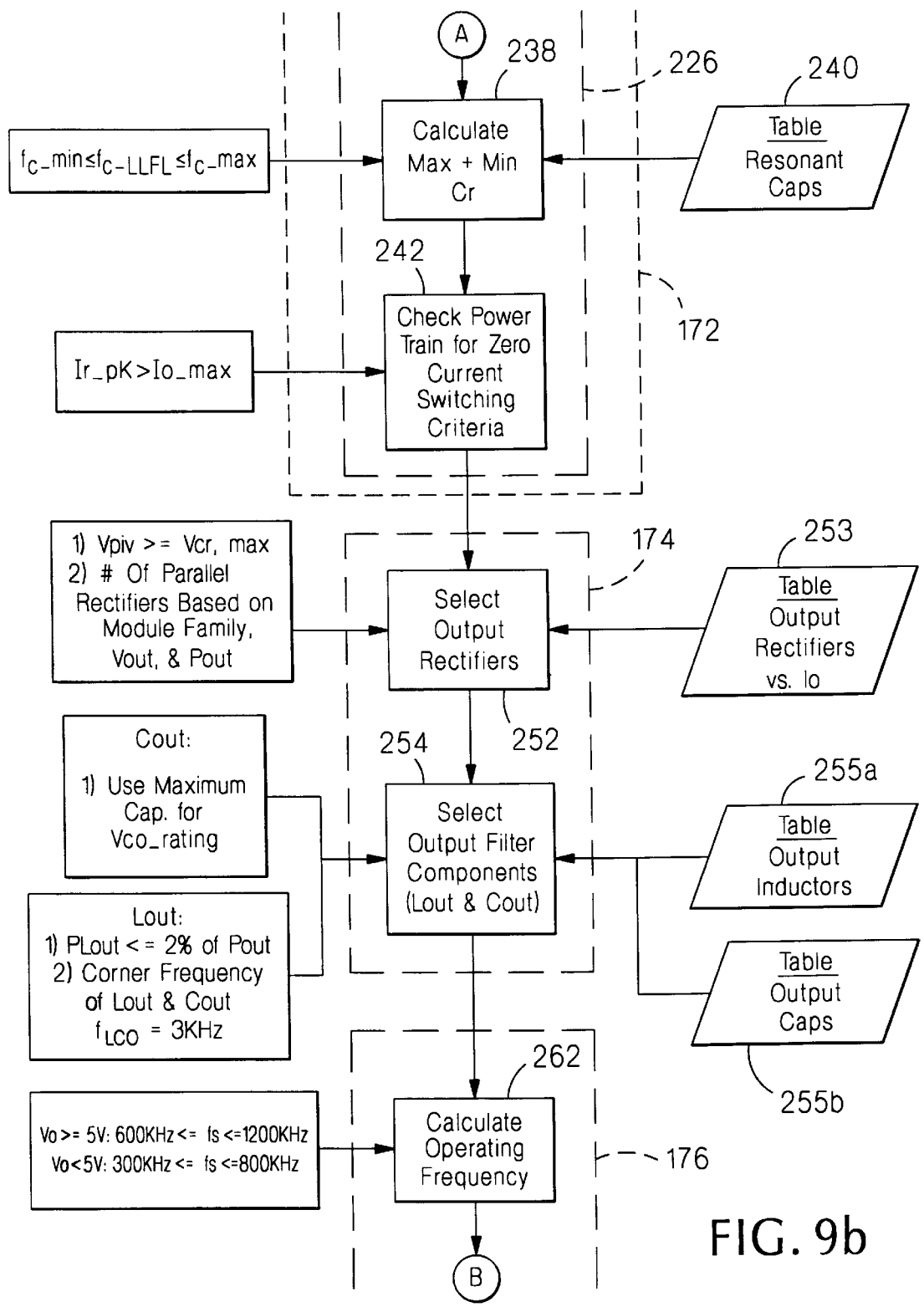
Figure 9C:
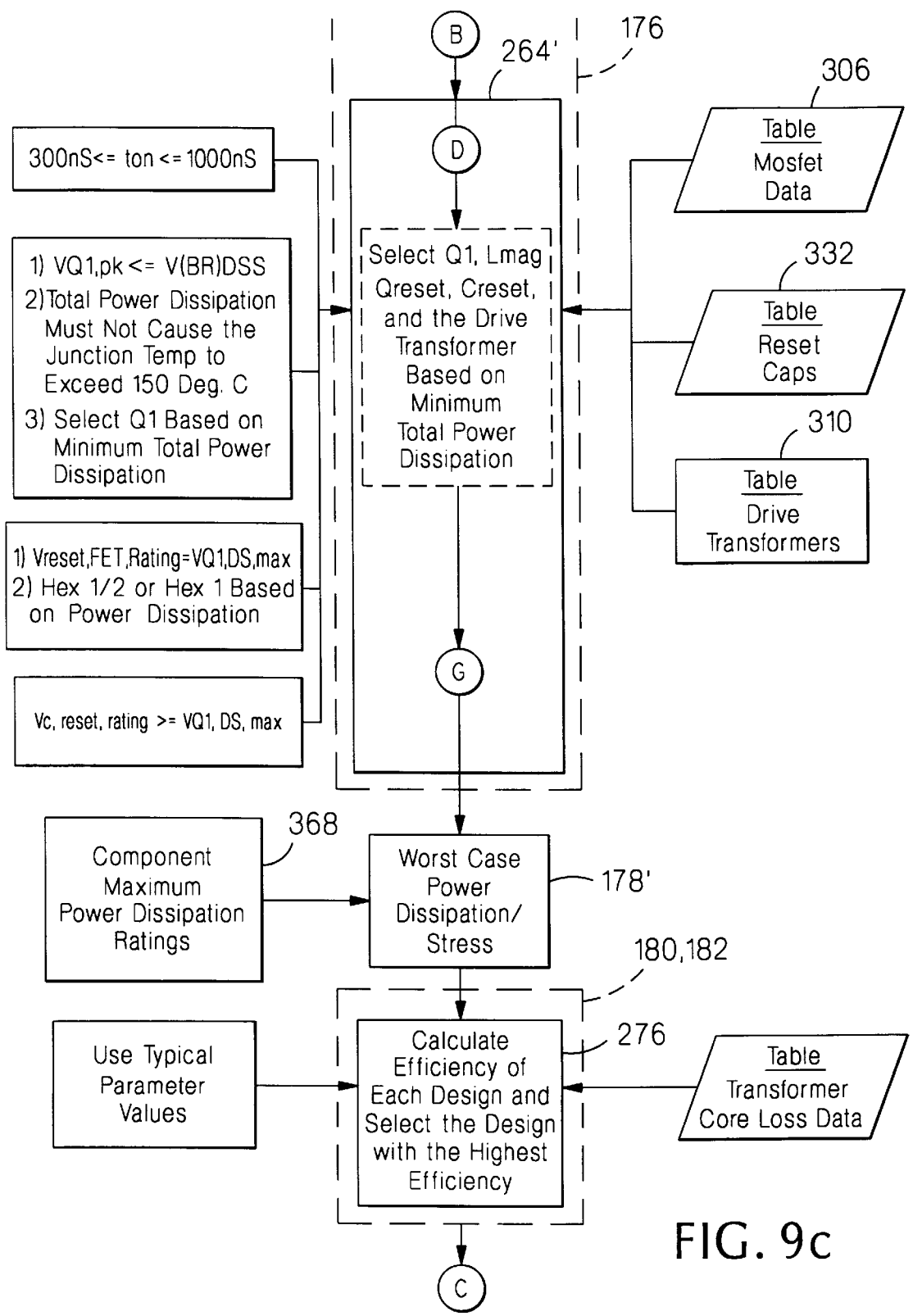
Figure 9D:
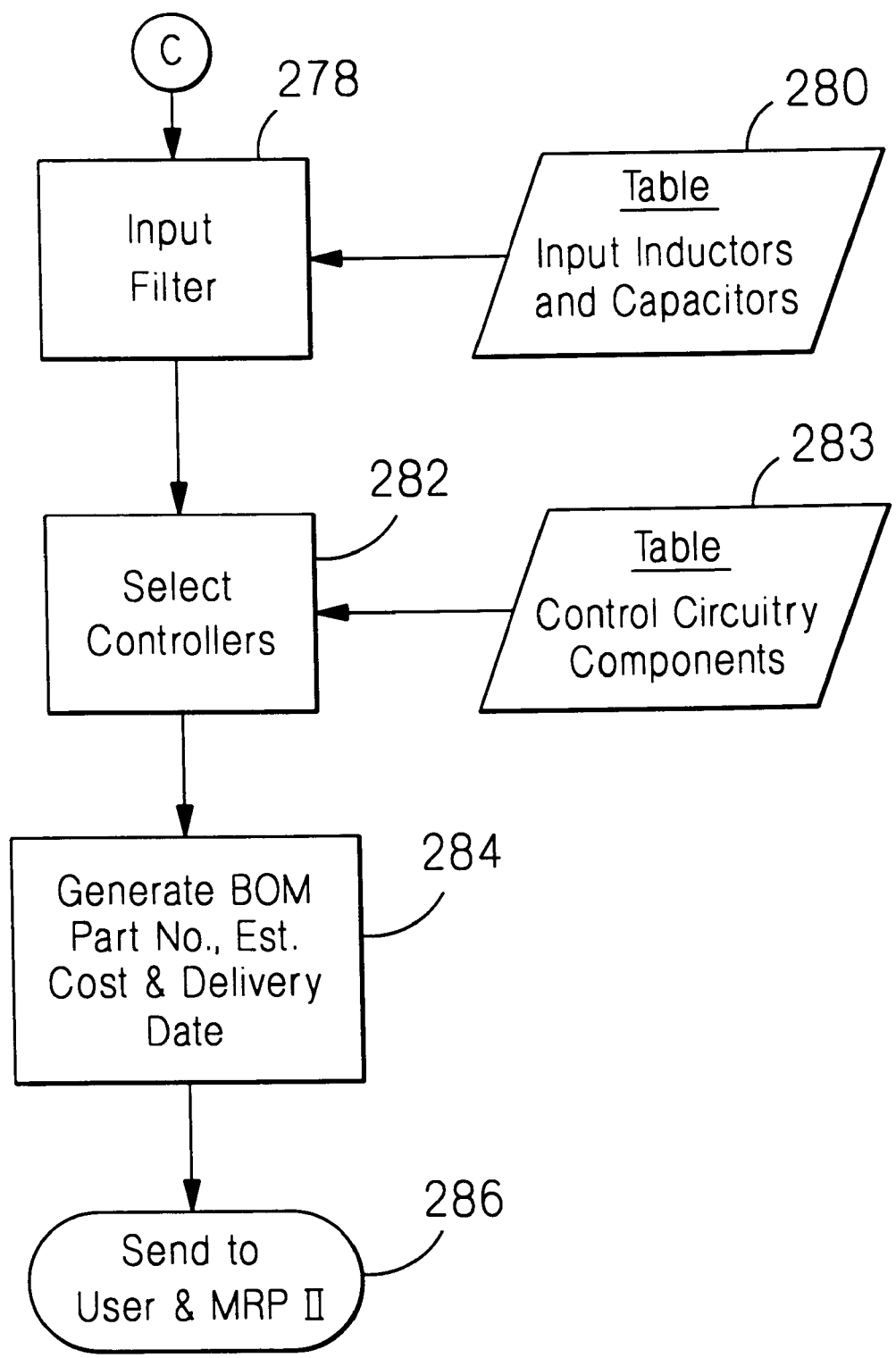

An example of a DC—DC converter is shown in FIGS. 1, 2, and 8. In the Figures, a zero-current switching single ended forward power converter 10 converts a DC input voltage ($V_{in}$) to a regulated DC output voltage ($V_{out}$). The input voltage passes through an input filter 12, including an input inductor 14 ($L_{in}$) and an input capacitor 16 ($C_{in}$), before being applied to a series circuit formed by a main switch 18 (Q1) and the primary winding 26 of a leakage-inductance transformer (T1) 24. During each converter operating cycle, the main switch 18 is opened and closed at times of zero current. This results in a 'quanta' of energy being transferred from the DC input source to the converter output via the resonant circuit formed by the leakage inductance of the transformer 24 and the resonant capacitors 36 ($C_r$). Energy flow is unidirectional, due to the forward rectifier 32 ($D_{FWD}$). The output inductor 40 ($L_{out}$) acts as a 'current sinking' load to discharge energy from the resonant capacitors; the combination of the output inductor and the output capacitors 42 ($C_{out}$) form an output filter which produces an essentially DC output voltage, $V_{out}$. The freewheeling diode 34 ($D_{FW}$) and the boost switch 49 are used to control the charging of the resonant capacitors so as to: (1) prevent the resonant capacitors from being charged to a negative voltage; and (2) control the amount of energy which is transferred forward during an operating cycle (and thereby control the operating frequency of the converter). Primary and secondary control circuitry (included within molded control assembly 44) maintains $V_{out}$ at a predetermined value by controlling the operating frequency (e.g., the number of operating cycles per second) of the power converter as the input voltage and load are varied. A reset circuit 22, also included within the molded assembly 44, including a reset capacitor ($C_{reset}$) in series with an auxiliary switch ($Q_{reset}$), acts as a "magnetizing current mirror" to reset the core of the transformer during each operating cycle. Control circuitry turns main switch Q1 on and off via drive transformer 20 ($T_D$)

More detailed descriptions of zero-current switching single ended forward converters, can be found in U.S. Pat. No. 4,415,959, "Forward Converter Switching at Zero Current;" U.S. Pat. No. 4,675,797, "Current-Fed Forward Converter Switching at Zero Current;" U.S. Pat. No. 5,235,502, "Zero Current Switching Forward Power Conversion With Controllable Energy Transfer;" and in U.S. patent application No. 08/187,296 (now U.S. Pat. No. 5,623,397), "Power Conversion in Anticipatory Reverse Boost Mode," incorporated by reference. For a more detailed description of the control circuitry, see U.S. Pat. No. 5,490,057, "Feedback Control System Having Predictable Open-Loop Gain," and U.S. patent application Ser. No. 08/077,011 (now abandoned), entitled "Power Converter Configuration, Control, and Construction," also incorporated by reference. For a more detailed description of the reset circuitry, see U.S. Pat. No. 4,441,146, entitled "Optimal Resetting of the Transformer's Core in Single Ended Forward Converters" and U.S. patent application Ser. No. 08/373,112 (now abandoned), entitled "Control of Stored Magnetic Energy in Power Converter Transformers," also incorporated by reference.

Construction of the converter is shown in FIG. 1. The main switch 18, as well as other heat generating semiconductors (such as the output rectifiers 32, 34), are mounted to a metal baseplate assembly 48. Input/output pads on the main switch 18 and the output rectifiers 32, 34 are electrically connected to corresponding pads on a mother board 50, and the remaining power converter components are mounted to and are electrically connected together through traces in the mother board. Fences 52, 54 are electrically connected to traces in the mother board and provide external electrical connections to the converter through pins 56 that extend through holes 58 in a stepped converter cover 60. For a more detailed description of the power converter configuration, see U.S. Pat. No. 5,365,403, "Packaging Electrical Components," incorporated by reference.

Figure 3A:
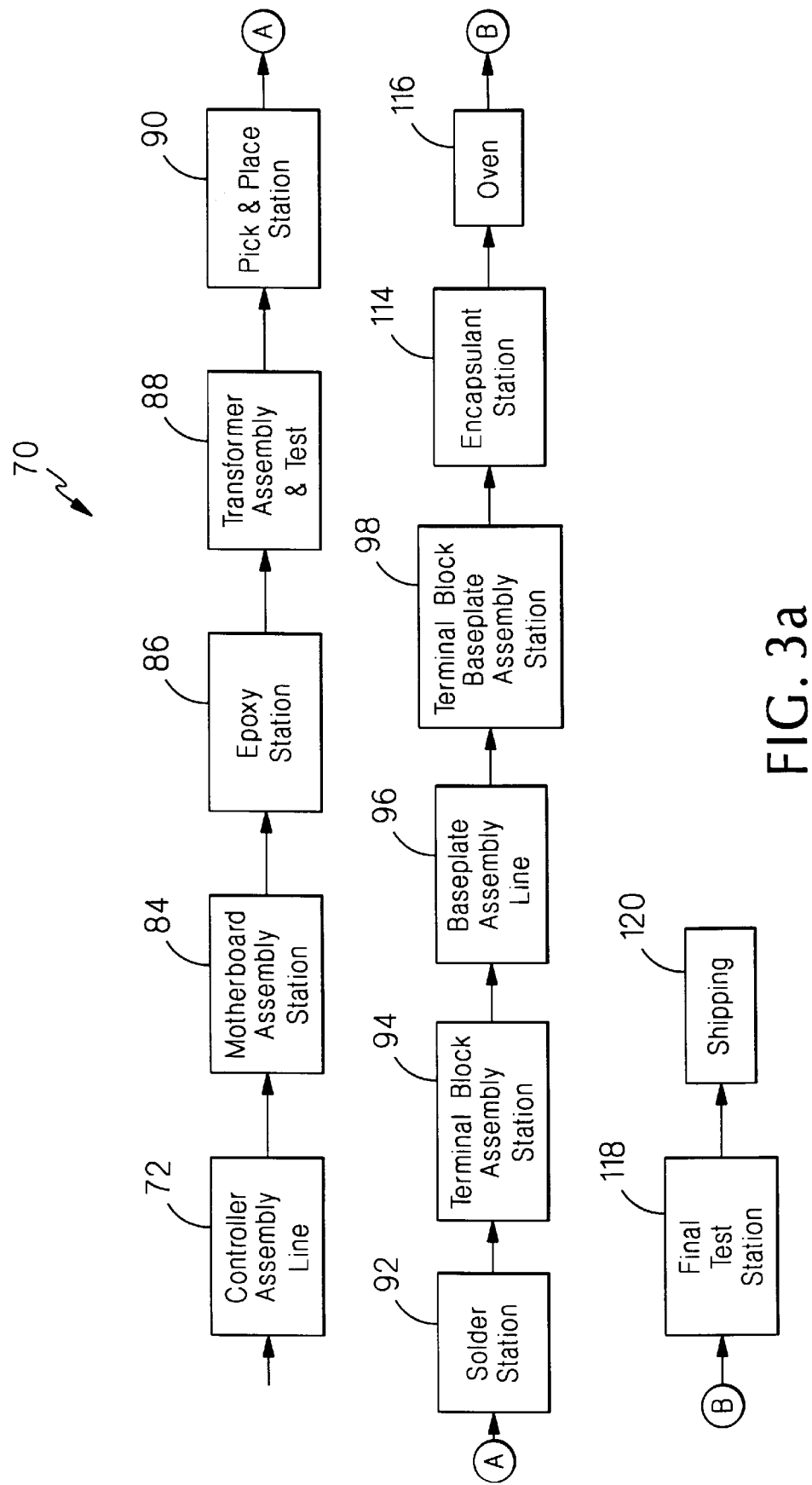
FIGS. 3a–3c are block diagrams of a power converter manufacturing line.
Figure 3B:
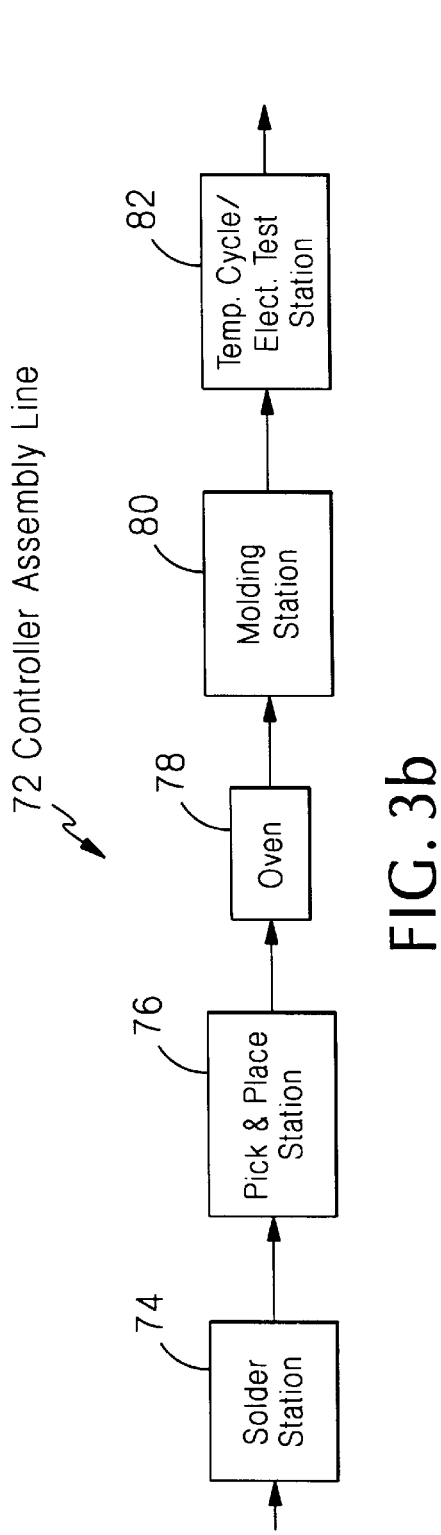
Figure 3C:
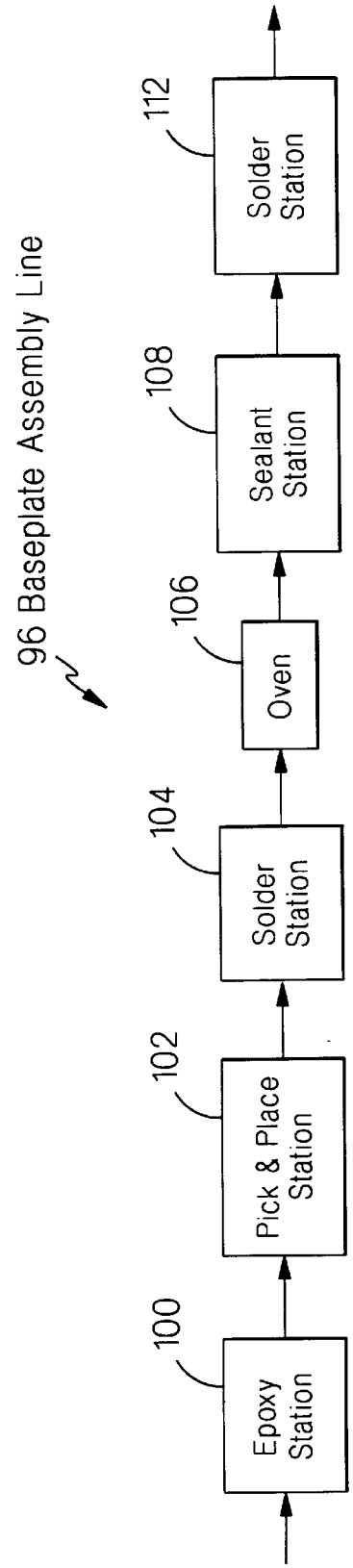

Referring to FIGS. 3a–3c, a power converter manufacturing line 70 includes a controller assembly line 72 for assembling the control assembly 44 (FIG. 1). At a solder station 74 (FIG. 3b) within the controller assembly line, solder paste is applied to predetermined locations on controller printed circuit boards (PCBs). At a pick and place station 76, controller electrical components are selected from available component stock and placed on the predetermined locations. Certain components are measured prior to placement and the measured values of these components are used to calculate values of other components which are to be incorporated into the converter. For example, a calculated value may be used to laser-trim a resistor blank to provide the exact value resistor needed to accurately set the desired value of converter output voltage. By this means, a few reels of resistor blanks may be used to create a virtually unlimited number of resistor values. For a more detailed explanation of component blank modification, see U.S. Pat. No. 5,443,534, entitled "Providing Electronic Components for Circuitry Assembly," incorporated by reference.

The loaded controller PCBs are passed through an oven 78 which reflows the solder paste. The PCB assemblies are then tested, and PCBs determined to have failures are discarded.

The remaining PCBs are passed through a molding station 80 where the primary and secondary controller sections are encapsulated in a molding compound. A portion of each PCB, which include the input/output pads for connecting the controllers to the mother board 50, are left exposed. For a more detailed description of the molding process, see U.S. Pat. No. 5,728,600, entitled "Circuit Encapsulation Process," incorporated by reference.

The primary and secondary controller halves are then separated and glued together in a side-by-side configuration (44, FIG. 1). The set of molded control assemblies are then inserted into a temperature cycling/electrical testing station 82 and tested as the temperature of the station is increased and decreased. Control assemblies which fail are discarded.

Each molded pair of PCBs is mounted and glued to a mother board 50 (FIG. 1) at a mother board assembly station 84. Surface mount epoxy, for holding down other components during the assembly process, is then applied to predetermined mother board locations at an epoxy station 86. At a transformer assembly and test station 88, core halves and winding bobbins are selected from available stock and used to assemble transformer T1 24 (FIG. 1). The magnetizing inductance of the transformers is accurately adjusted at an automated inductance-setting unit, and transformers are placed onto the mother board (and held in place by the surface mount epoxy). For a more detailed description of the inductance setting process and equipment, see U.S. patent application Ser. No. 08/347,874 (now abandoned), entitled "Setting Inductance Value of Magnetic Components," incorporated by reference. A pick and place station 90 selects additional components, including $C_r$, $C_{out}$, $C_{in}$, aligns component pins with corresponding holes in the mother board by means of a vision system and inserts the components in the remaining predetermined mother board locations.

The mother boards are then passed through a solder fountain in a solder station 92. Solder from a solder fountain provides electrical connections between the mother board holes and the component pins inserted in the holes. For a more detailed description of the solder fountain, see U.S. patent application Ser. No. 08/420,553 (now U.S. Pat. No. 5,560,537), entitled "Soldering," incorporated by reference.

At a terminal block assembly station 94, fences 52 and 54 (FIG. 1) are soldered to the mother board. A baseplate, containing the correct complement of power semiconductor devices for a specific converter model, is provided by a baseplate assembly line 96 and mounted to the fence and mother board combination at terminal block/baseplate assembly station 98. At a sealant station 108, sealant is dispensed along edge 110 (FIG. 1) of the baseplate, and at a solder station 112, solder is applied to input/output pads on the main switch and output rectifiers. Electrical pads on the mother board are soldered to these input/output pads after the mother board is connected to the baseplate. A cover 60 (FIG. 1) is also mounted over the mother board and baseplate at assembly station 98. For a more detailed description of how baseplates are constructed, see U.S. patent application Ser. No. 08/382,676, entitled "Flowing Solder in a Gap," and U.S. patent application Ser. No. 08/523,873, entitled "Packaging Electrical Circuits," which are incorporated by reference.

After attaching the cover to the baseplate, the cavity between the cover and the baseplate may be filled with encapsulant at an encapsulant station 114. For a detailed description of how the cavity is filled, see U.S. patent application Ser. No. 08/582,634, entitled "Filling of Assemblies," incorporated by reference. The assembly is then passed through an oven 116 to cure the encapsulant. The converters are then passed to a final test station 118 before being shipped 120 to customers.

What is claimed is:

1. A method for use in determining a configuration of a power converter comprising:

receiving power converter operating characteristic information;

using a computer, determining a plurality of alternative configurations of a power converter that are consistent with the operating characteristic information and determining efficiency characteristics of each of the alternative configurations; and then selecting a configuration from the plurality of alternative configurations that tends to be optimal with respect to efficiency.

2. The method of claim 1, wherein efficiency is measured as power converter heat loss.

3. A method for use in determining a configuration of a power converter comprising:

receiving power converter operating characteristic information;

receiving optimization criteria;

using a computer, determining a plurality of alternative configurations of a power converter that are consistent with the operating characteristic information and determining performance characteristics of each of the alternative configurations with respect to the optimization criteria; and then selecting a configuration from the plurality of alternative configurations that tends to be optimal with respect to the optimization criteria.

4. The method of claims 1 or 3, wherein determining alternative power converter configurations includes calculating a combined heat loss for each alternative power converter configuration, and wherein selecting one of the power converter configurations includes selecting a configuration having the least combined heat loss.

5. The method of claim 4, wherein determining alternative power converter configurations further includes:

evaluating the component interrelations for each alternative power converter configuration.

6. A method for use in determining a configuration of a power converter comprising:

determining a plurality of alternative configurations of a power converter that are consistent with operating characteristic information;

calculating a combined heat loss for each of the alternative power converter configurations; and selecting a configuration from the plurality of alternative configurations that tends to minimize the combined heat loss.

7. A method for use in determining a configuration of a power converter comprising:

receiving power converter operating characteristic information;

receiving selection criteria; and using a computer, determining a plurality of alternative configurations of a power converter that are consistent with the operating characteristic information and determining performance characteristics of each of the alternative configurations with respect to the selection criteria; and then selecting a configuration from the plurality of alternative configurations that tends to be optimal in response to the selection criteria.

8. The method of claims 1 or 3, wherein determining alternative power converter configurations includes:

eliminating power converter configurations that are inconsistent with a predetermined design constraint.

9. The method of claim 8, wherein the predetermined design constraint is a power dissipation threshold.

10. The method of claims 1 or 3, wherein determining alternative power converter configurations includes:

eliminating power converter configurations that are inconsistent with the received power converter operating characteristic information.

11. The method of claim 1, 3, 6, or 7, wherein determining alternative configurations includes:

selecting power converter components from an inventory of available components having a range of parameter values.

12. The method of claim 11, wherein the range comprises two parameter values.

13. The method of claims 11, wherein the power converter components include a number of primary turns on a transformer.

14. The method of claims 11, wherein the power converter components include a number of secondary turns on a transformer.

15. The method of claims 11, wherein the power converter components include a resonant capacitor.

16. The method of claims 11, wherein the power converter components include a transformer having a core shield pattern.

17. The method of claims 11, wherein the power converter components include output rectifiers.

18. The method of claims 11, wherein the power converter components include output filter components.

19. The method of claims 11, wherein the power converter components include input filter components.

20. The method of claims 11, wherein the power converter components include main switches.

21. The method of claims 11, wherein the power converter components include drive transformers.

22. The method of claims 11, wherein the power converter components include reset circuit components.

23. The method of claim 1, 3, 6, or 7, further including generating a bill of materials for the selected one of the alternative power converter configurations.

24. The method of claim 1, 3, 6, or 7, further comprising:

determining power converter configurations that are consistent with previously received operating characteristic information and are functionally fully backwards compatible with power converters delivered earlier in time.

25. The method of claim 1, 3, 6, or, 7, further comprising:

providing a user interface to the computer, wherein the operating characteristic information is received through the user interface.

26. The method of claim 25, wherein the user comprises a customer.

27. The method of claim 25, wherein the user comprises a power converter designer.

28. The method of claim 3, wherein determining alternative power converter configurations includes determining performance metrics for each alternative power converter configuration based on a predetermined set of performance criteria.

29. The method of claim 28 wherein the performance criteria and the optimization criteria are the same.

30. The method of claim 28, further including: storing the determined performance metrics.

31. The method of claim 30, further including: accessing the stored determined performance metrics.

32. The method of claim 3, wherein the optimization criteria include efficiency, reliability, lead time, conducted noise, or cost.

33. The method of claim 3, wherein the optimization criteria include at least two criteria.

34. The method of claim 6, further comprising: receiving the operating characteristic information from a user.

35. The method of claim 7, wherein the selection criteria include efficiency, reliability, lead time, conducted noise, or cost.

36. The method of claim 7, further comprising:
receiving another selection criteria, wherein the power converter configuration is selected in accordance with both selection criteria.

37. The method of claim 7, wherein determining alternative power converter configurations includes determining performance metrics for each alternative power converter configuration based on a predetermined set of performance criteria.

38. The method of claim 37 wherein the performance criteria and the selection criteria are the same.

39. The method of claim 37, further including: storing the determined performance metrics.

40. The method of claim 39, further including: accessing the stored determined performance metrics.

41. A method of supplying a power converter comprising:
receiving, at a first party, operating characteristic information about a power converter from a second party; and
using a computer, determining a configuration of a power converter that is consistent with the operating characteristic information and tends to optimize the power converter based on selected optimization criteria;
wherein the determining comprises generating a plurality of alternative configurations consistent with the operating characteristic information, determining performance characteristics of each of the alternative configurations with respect to the optimization criteria, and then selecting a configuration from the plurality of alternative configurations using the optimization criteria; and
providing specifications for the determined power converter configuration.

42. The method of claim 41, further comprising:
receiving, at the first party, the optimization criteria from the second party.

43. The method of claim 41, further comprising:
generating a bill of materials for the determined power converter configuration.

44. The method of claim 43, further comprising:
sending electronically the bill of materials to a computer integrated manufacturing line.

45. The method of claim 41, further comprising:
building the determined power converter configuration at a computer integrated manufacturing facility.

46. The method of claim 41, further comprising:
providing the specifications for the determined power converter configuration to the second party.

47. The method of claim 41, wherein the specifications include availability information for the determined power converter configuration.

48. The method of claim 41, wherein the specifications include cost information for the determined power converter configuration.

49. The method of claim 41, wherein the computer is at a site local to the first party and wherein receiving, at the first party, operating characteristic information about a power converter from the second party includes:
accessing a user interface of the computer from a site at the second party that is remote to the site local to the first party.

50. A system for use in determining a configuration of a power converter comprising:
a program comprising executable instructions, at least a portion of which is stored in memory for execution by a processor;
wherein execution of the program causes the system to determine, and store in memory, a configuration of a power converter that is consistent with operating characteristics and tends to optimize the configuration based on selected optimization criteria;
wherein the determining comprises generating a plurality of alternative configurations consistent with the operating characteristic information, determining performance characteristics of each of the alternative configurations with respect to the optimization criteria, and then selecting a configuration from the plurality of alternative configurations using the optimization criteria; and
a user interface, coupled to the program, that receives the power converter operating characteristics.

51. The system of claim 50, wherein the user interface also receives the optimization criteria.

52. The system of claim 50, further comprising:
a computer for executing the program.

53. A method for use in determining a power converter configuration comprising:
receiving, at a first party, functional operating characteristic information about a power converter and optimization criteria from a second party;
using a computer, accessing a power converter generator that determines power converter configurations that meet the functional operating characteristic information and which determines and stores information about each configuration with respect to the optimization criteria;
selecting one of the determined power converter configurations that tends to optimize the power converter configuration based on the optimization criteria;
providing specifications for the selected power converter configuration to the second party;
receiving, at the first party, approval of the selected power converter configuration from the second party; and
delivering fabrication information for the selected power converter configuration to a manufacturing facility.

54. The method of claim 53, further comprising:
initiating a communication connection between the first party and the second party; and
sending the operating characteristic information and the optimization criteria from the second party to the first party via the communication connection.

55. The method of claim 53, further comprising:
building a power converter from the fabrication information; and
shipping the power converter to the second party.

56. The method of claim 53, further comprising, before receiving approval:
   receiving, at the first party, different operating characteristic information from the second party;
   in the computer, determining another power converter configuration that is consistent with the different operating characteristic information and tends to optimize the another power converter configuration's based on the optimization criteria; and
   providing the specifications for the determined another power converter configuration to the second party.

57. The method of claim 53, further comprising, before receiving approval:
   receiving, at the first party, different optimization criteria from the second party;
   in the computer, determining another power converter configuration that is consistent with the operating characteristic information and tends to optimize the another power converter configuration based on the different optimization criteria; and
   providing the specifications for the determined another power converter configuration to the second party.

58. The method of claim 1, 3, 7, 41, 50, or 53 further comprising determining using the computer a calculated value for efficiency for each configuration in the plurality.

59. The method of claim 1, 3, 6, 7, 41, 50, or 53 wherein the determining is carried out by a computer.

60. The method of claim 10 further comprising eliminating configurations that are inconsistent with production capabilities.

61. The method of claim 1, 3, 7, 41, or 50 further comprising delivering fabrication information for the selected configuration to a manufacturing facility.

62. The method of claim 1, 3, 7, 41, 50, or 53 wherein the plurality of alternative configurations do not satisfy all of the operating characteristics.

63. The method of claim 62 wherein the selected configuration does not satisfy all of the operating characteristics.

64. The method of claim 1, 3, 7, 41, 50, or 53 wherein some or all of the plurality of alternative configurations satisfy the operating characteristics.

65. The method of claim 33 wherein the at least two criteria are weighted.

66. The method of claim 1, 3, 6 or 7 further comprising providing specifications for the determined configuration.

* * * * *